United States Patent
Kim et al.

(10) Patent No.: US 9,344,904 B2
(45) Date of Patent: May 17, 2016

(54) INTERFERENCE ALIGNMENT METHOD AND DEVICE IN CELLULAR NETWORK

(75) Inventors: Kijun Kim, Anyang-si (KR); Byounghoon Kim, Anyang-si (KR); Joonho Cho, Pohang (KR); Jeongho Yeo, Pohang (KR); Younggeon Yoo, Pohang (KR)

(73) Assignees: LG ELECTRONICS INC., Seoul (KR); POSTECH ACADEMY-INDUSTRY FOUNDATION, Pohang (KR)

( * ) Notice: Subject to any disclaimer, the term of this patent is extended or adjusted under 35 U.S.C. 154(b) by 197 days.

(21) Appl. No.: 13/978,365

(22) PCT Filed: Jan. 6, 2012

(86) PCT No.: PCT/KR2012/000178
§ 371 (c)(1),
(2), (4) Date: Jul. 3, 2013

(87) PCT Pub. No.: WO2012/093904
PCT Pub. Date: Jul. 12, 2012

(65) Prior Publication Data
US 2013/0279422 A1    Oct. 24, 2013

Related U.S. Application Data

(60) Provisional application No. 61/430,189, filed on Jan. 6, 2011.

(51) Int. Cl.
*H04W 24/02* (2009.01)
*H04B 7/02* (2006.01)

(52) U.S. Cl.
CPC ............... *H04W 24/02* (2013.01); *H04B 7/024* (2013.01)

(58) Field of Classification Search
None
See application file for complete search history.

(56) References Cited

U.S. PATENT DOCUMENTS

| | | | |
|---|---|---|---|
| 2008/0019457 A1* | 1/2008 | Waters et al. | 375/267 |
| 2010/0227637 A1* | 9/2010 | Kwon et al. | 455/522 |
| 2011/0026629 A1* | 2/2011 | Nekoui et al. | 375/267 |
| 2011/0070918 A1* | 3/2011 | Hafeez | 455/522 |
| 2011/0085448 A1* | 4/2011 | Kuwahara | 370/242 |
| 2012/0147843 A1* | 6/2012 | Pison et al. | 370/330 |

OTHER PUBLICATIONS

Cadambe et al., "Interface Alignment and the Degrees of Freedom of Wireless X Networks", IEEE Transactions on Information Theory, vol. 55, No. 9, Sep. 2009, pp. 3893-3908.
Tresch et al., "Cellular Interface Alignment with Imperfect Channel Knowledge", 2009 IEEE International Conference on Communications Workshops, Jun. 18, 2009, 5 pages.
Yetis et al., "On Feasibility of Interference Alignment in MIMO Interference Networks", IEEE Transactions on Signal Processing, vol. 56, No. 9, Sep. 2010, pp. 4771-4782.

\* cited by examiner

*Primary Examiner* — Charles C Jiang
*Assistant Examiner* — George Atkins, Jr.
(74) *Attorney, Agent, or Firm* — Birch, Stewart, Kolasch & Birch, LLP

(57) ABSTRACT

A method and apparatus are described for aligning reception signals and interference signals by a base station (BS) configured to receive a signal from at least one user equipment (UE) in a cellular network. The reception signals are received from UEs belonging to a serving cell of the BS, and the interference signals are received from UEs belonging to a neighbor cell of the BS. A signal space receiving the reception signals and the interference signals is divided into a plurality of divided signal spaces, each having a size of N. K reception signals from among the reception signals are arranged in each divided signal space. The K reception signals arranged in each divided signal space are orthogonal to each other.

11 Claims, 20 Drawing Sheets

FIG. 4A $$\begin{bmatrix} 2 & 1 & -3 & -1 & -2 & -3 \\ 1 & -1 & 4 & 7 & -1 & -2 \\ 7 & 1 & -3 & 1 & 2 & 3 \\ 6 & -1 & -2 & -1 & 9 & -3 \\ 3 & 1 & 3 & 3 & -2 & -8 \\ -5 & 1 & -4 & -6 & -1 & 3 \end{bmatrix} \begin{matrix} \text{User 1, 2} \\ \text{User 1, 3} \\ \text{User 1, 4} \\ \text{User 2, 3} \\ \text{User 2, 4} \\ \text{User 3, 4} \end{matrix} \Bigg\} \text{User combination}$$

Available frequency

FIG. 4B $$\begin{bmatrix} 2 & 1 & -3 & -1 & -2 & -3 \\ 1 & -1 & 4 & 7 & -1 & -2 \\ 7 & 1 & -3 & 1 & 2 & 3 \\ 6 & -1 & -2 & -1 & 9 & -3 \\ 3 & 1 & 3 & 3 & -2 & -8 \\ -5 & 1 & -4 & -6 & -1 & 3 \end{bmatrix} \begin{matrix} \text{User 1, 2} \\ \text{User 1, 3} \\ \text{User 1, 4} \\ \text{User 2, 3} \\ \text{User 2, 4} \\ \text{User 3, 4} \end{matrix} \Bigg\} \text{User combination}$$

Available frequency

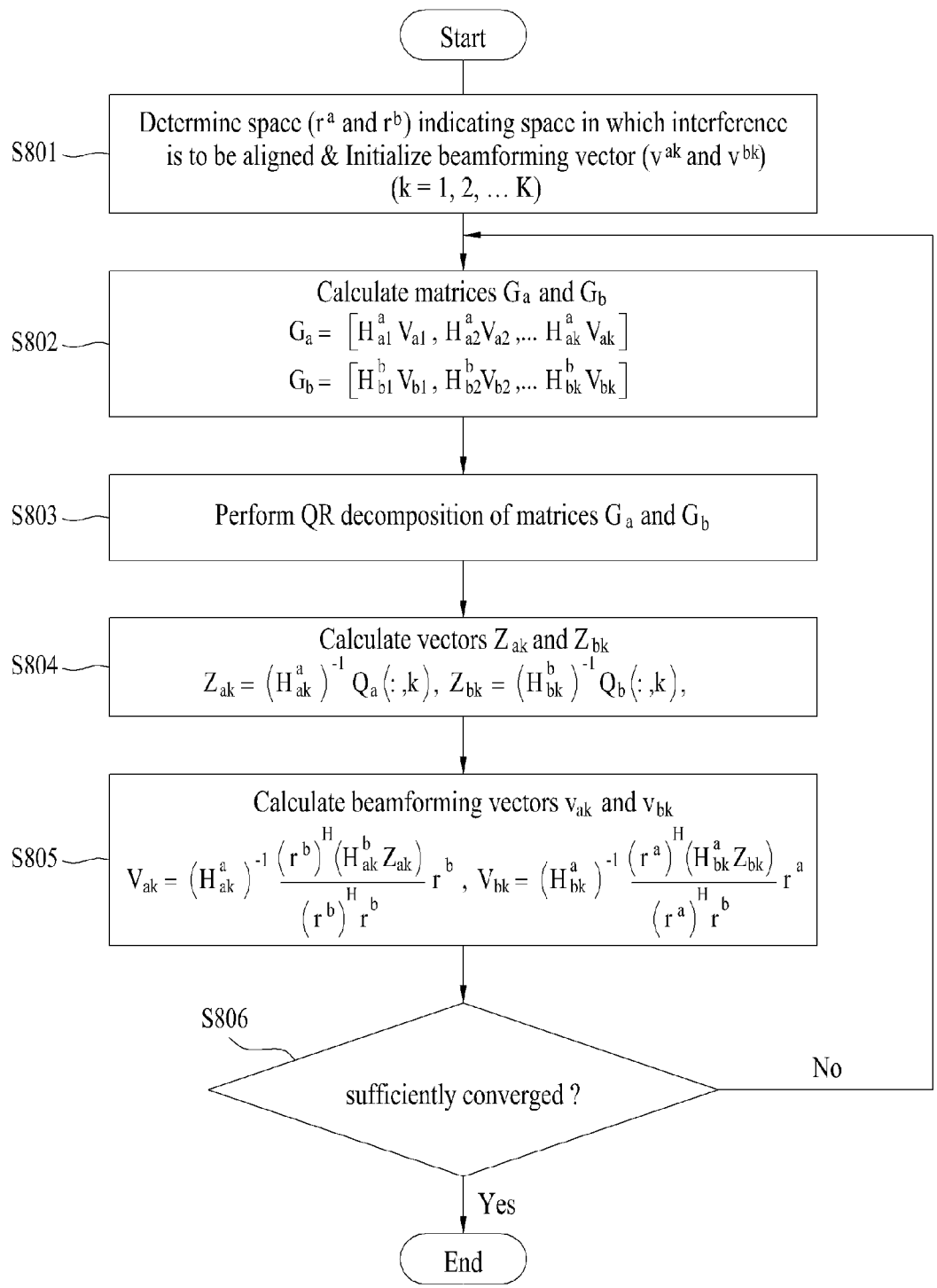

INTERFERENCE ALIGNMENT METHOD AND DEVICE IN CELLULAR NETWORK

CROSS REFERENCE TO RELATED APPLICATIONS

This application is the National Phase of PCT/KR2012/000178 filed on Jan. 6, 2012, which claims priority under 35 U.S.C. 119(e) to U.S. Provisional Application No. 61/430,189 filed on Jan. 6, 2011, all of which are hereby expressly incorporated by reference into the present application.

BACKGROUND OF THE INVENTION

1. Field of the Invention

The present invention relates to an interference alignment method for maintaining no interference between users located in a cell in a cellular network, and dividing a desired signal and interference from other cells into different signal spaces.

2. Background Art

In recent times, the number of high-speed wireless communication such as the Internet is rapidly increasing. Therefore, many developers and companies are conducting intensive research into a variety of communication techniques capable of guaranteeing high-speed wireless communication for the next-generation wireless communication system.

Therefore, many researches for enabling a plurality of users to efficiently use resources such as time, frequency, space, etc. for communication are underway. However, the conventional technologies such as frequency division access, time division access, and code division access cannot obtain higher channel capacity for high-speed communication due to interference among many users or UEs as compared to given resources.

Therefore, there is proposed interference alignment (IA) technology for dividing a desired signal and undesired interference into different spaces and transmitting the desired signal and the undesired interference through different spaces so as to solve the problem in which it is impossible to obtain high channel capacity due to interference between users or UEs, such that theoretical development of a transmission/reception technique has been continuously achieved. The IA technology prevents throughput deterioration caused by interference without complicated error correction coding in multi-user environments of a general interference channel, and at the same time maximizes use of given resources so as to obtain a maximum degree-of-freedom, such that the IA technology can obtain a high channel capacity.

In more detail, the IA technology can almost achieve channel capacity of an interference channel under a high SNR. The IA technology has been extended not only to an interference channel but also to a cellular network, and has been intensively researched. Users (or UEs) located at another cell in a cellular network composed of two cells can arrange interference signals affecting a base station (BS) of a current cell in a specific signal space, and receive the arranged interference signals, such that many more signal spaces for users located in the current cell can be acquired. For example, assuming that each user (or each UE) transmits only one stream, the user may arrange interference signals affecting the BS of another cell within a signal space of one dimension, and receive the arranged interference signals.

SUMMARY OF THE INVENTION

The present invention relates to an interference alignment method for use in a cellular network.

In a current cellular network, users (UEs) located in the cell can generally remove mutual interference through frequency division access, time division access, etc. However, interference signals affected from the users to the BS of another cell are arranged in a specific signal space such that it is impossible to receive the interference signals. As a result, the IA technology cannot be used in the current cellular network.

In contrast, when using the IA technology, interference from another cell is arranged and received in a specific signal space, such that many more signal spaces for a desired signal can be allocated. However, unlike the above-mentioned case of using frequency division access, time division access, etc., users located in the cell are configured to mutually interfere with each other. Since there is interference among users located in the cell, throughput of each user located in the cell does not increase up to a specific value or higher, and throughput of each user located in the cell may also be lower than those of frequency division access, time division access, etc.

Therefore, an object of the present invention is to provide a method for receiving signals of users located in the cell without generating interference between the signals, and at the same time calculating a beamforming vector capable of arranging interference from other cells.

The objects of the present invention can be achieved by providing a method for aligning a reception signal and an interference signal by a base station (BS) configured to receive a signal from at least one user equipment (UE) in a cellular network, the method including: receiving a reception signal and an interference signal, wherein the reception signal is received from UEs belonging to a serving cell of the BS, and the interference signal is received from UEs belonging to a neighbor cell of the BS; dividing a signal space receiving the reception signal and the interference signal into at least one signal space having a size of N; and arranging K reception signals from among the reception signals in each divided signal space, wherein the K reception signals arranged in each divided signal space are orthogonal to each other.

N and K may be configured to satisfy a condition of N≥(3K/2). N may be set to 3 and K is set to 2.

The interference signals may be configured to satisfy an equation $H_{bi}{}^a v_{bi} = r^a$, where 'a' is a serving cell of the BS, 'b' is a neighbor cell of the BS, $H_{bi}{}^a$ is a channel matrix of a channel ranging from an i-th UE belonging to the neighbor cell 'b' to the serving cell 'a', $v_{bi}$ is a beamforming vector of the i-th UE belonging to the neighbor cell 'b', $r^a$ is a signal space in which the interference signals of the cell 'a' are arranged.

The K reception signals aligned in each divided signal space may be configured to satisfy an equation $(H_{ai}{}^a v_{ai})^H (H_{aj}{}^a v_{aj}) = 0$, where $H_{ai}{}^a$ is a channel matrix of a channel ranging from an i-th UE belonging to the cell 'a' to the BS, $v_{ai}$ is a beamforming vector of the i-th UE belonging to the cell 'a', $v_{aj}$ is a beamforming vector of the j-th UE belonging to the cell 'a', and $(\cdot)^H$ is a Hermitian transpose matrix of one matrix.

In accordance with another aspect of the present invention, a method for aligning a reception signal and an interference signal by a base station (BS) configured to receive a signal from at least one user equipment (UE) in a cellular network includes: receiving a reception signal and an interference signal, wherein the reception signal is received from UEs belonging to a serving cell of the BS, and the interference signal is received from UEs belonging to a neighbor cell of the BS; determining a signal space in which the interference signals are to be aligned, and initializing a beamforming vector of the reception signals; generating a reception signal spatial matrix on the basis of the initialized beamforming vector and a channel matrix of a channel ranging from a UE belonging to a serving cell of the BS to the BS; performing QR decomposition of the reception signal spatial matrix into an orthogonal matrix and an upper triangular matrix; generating a user vector for a UE belonging to the serving cell of the BS on the basis of the decomposed orthogonal matrix and the channel matrix; and updating a beamforming vector of the reception signals on the basis of the user vector and the signal space.

The method may further include, after updating the beamforming vector of the reception signals, determining whether the updated beamforming vector converges on a predetermined range.

The generating of the reception signal spatial matrix may include generating the reception signal spatial matrix through an equation $[H_{a1}{}^a v_{a1}, H_{a2}{}^a v_{a2}, \ldots, H_{ak}{}^a v_{ak}]$, where 'a' is a serving cell of the BS, $H_{ak}{}^a$ is a channel matrix of a channel ranging from a k-th UE belonging to the cell 'a' to the cell 'a', and $v_{ak}$ is a beamforming vector of the k-th UE belonging to the cell 'a'.

The generating of the user vector of the UE belonging to the serving cell of the BS may include generating the user vector through an equation $z_{ak}=(H_{ak}{}^a)^{-1}Q_a(:,k)$, where 'a' is a serving cell of the BS, $z_{ak}$ is a user vector of a K-th UE belonging to the cell 'a', $H_{ak}{}^a$ is a channel matrix of a channel ranging from a k-th UE belonging to the cell 'a' to the cell 'a', and $Q_a(:,k)$ is a matrix composed of a K-th column of the orthogonal matrix.

The updating of the transmission vector of the reception signals may include performing update using an equation $$v_{ak} = (H_{ak}^b)^{-1} \frac{(r^b)^H (H_{ak}^b z_{ak})}{(r^b)^H r^b} r^b,$$

where 'a' is a serving cell of the BS, 'b' is a neighbor cell of the BS, $v_{ak}$ is a beamforming vector of a k-th UE belonging to the cell 'a', $H_{ak}^b$ is a channel matrix of a channel ranging from a k-th UE belonging to the cell 'a' to the cell 'b', $r^b$ is a signal space in which interference signals of the cell 'b' are to be arranged, $z_{ak}$ is a user vector of a K-th UE belonging to the cell 'a', and $(\bullet)^H$ is a Hermitian transpose matrix of one matrix.

In accordance with another aspect of the present invention, a base station (BS) for aligning a reception signal and an interference signal in a cellular network, wherein the reception signal is received from UEs belonging to a serving cell of the BS and the interference signal is received from UEs belonging to a neighbor cell of the BS includes: a transceiver configured to transmit/receive signals to/from an external part; and a controller configured to be connected to the transceiver, wherein the controller divides a signal space receiving the reception signal and the interference signal into at least one signal space having a size of N, and arranges K reception signals from among the reception signals in each divided signal space, wherein the K reception signals arranged in each divided signal space are orthogonal to each other. N may be set to 3 and K may be set to 2.

In accordance with another aspect of the present invention, a base station (BS) for aligning a reception signal and an interference signal in a cellular network, wherein the reception signal is received from UEs belonging to a serving cell of the BS, and the interference signal is received from UEs belonging to a neighbor cell of the BS, includes: a transceiver configured to transmit/receive signals to/from an external port; a controller configured to be connected to the transceiver, wherein the controller determines a signal space in which the interference signals are to be aligned, initializes a beamforming vector of the reception signals, generates a first matrix on the basis of the initialized beamforming vector and a channel matrix of a channel ranging from a UE belonging to a serving cell of the BS to the BS, performs QR decomposition of the first matrix, generates a user vector for a UE belonging to the serving cell of the BS on the basis of the decomposed Q matrix and the channel matrix, and updates a transmission vector of the reception signals on the basis of the user vector and the signal space.

The controller, after updating the beamforming vector of the reception signals, may determine whether the updated transmission vectors converge on a predetermined range.

As is apparent from the above description, according to the interference alignment (IA) method for use in the cellular network according to embodiments of the present invention, signals of users located in the same cell can be received without mutual interference (or with very low interference), and at the same time interferences from other cells may be arranged as necessary. In addition, the method according to the embodiments of the present invention can achieve a higher transfer rate than the conventional interference alignment (IA) method.

BRIEF DESCRIPTION OF THE DRAWINGS

FIGS. 4A and 4B are conceptual diagrams illustrating a method for distributing signal spaces and users for interference alignment (IA) according to a first embodiment of the present invention.

FIG. 6 is a flowchart illustrating a method for generating a beamforming vector for interference alignment according to a second embodiment of the present invention.

DETAILED DESCRIPTION OF THE INVENTION

Figure 1:
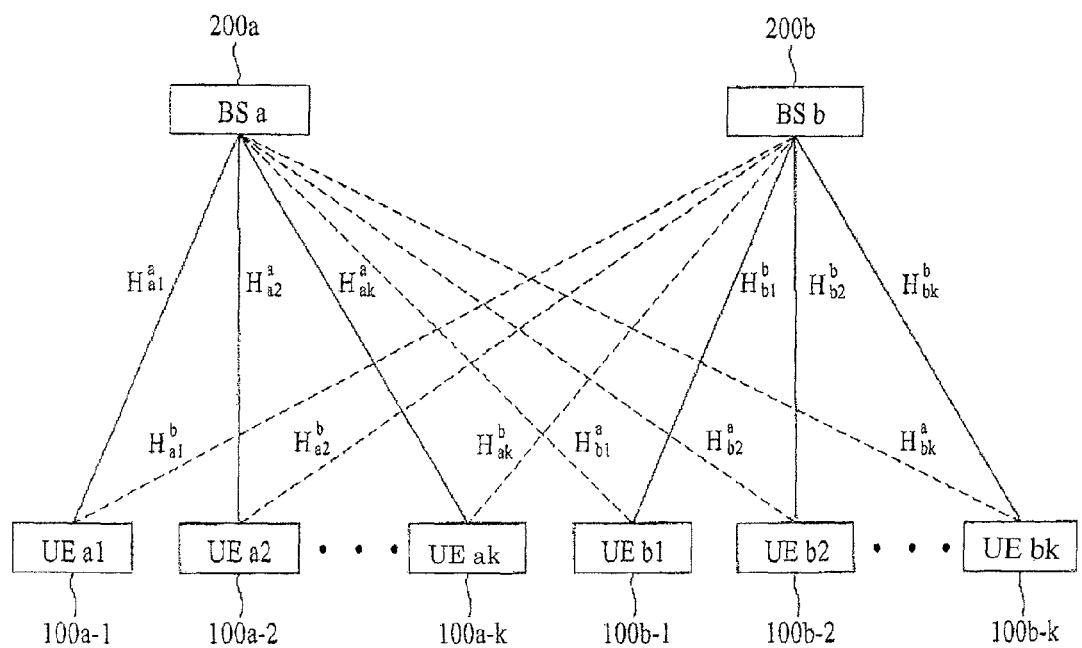
FIG. 1 is a conceptual diagram illustrating an interference channel for use in a cellular network.

Technical terms used in this specification are used merely to illustrate specific embodiments, and it should be understood that they are not intended to limit the present disclosure. So long as not defined otherwise, all terms used herein including technical terms may have the same meaning as those generally understood by an ordinary person skilled in the art to which the present disclosure belongs, and should not be construed in an excessively comprehensive manner or an extremely restricted manner. In addition, if a technical term used in the description of the present disclosure is an erroneous term that fails to clearly express the idea of the present disclosure, it should be replaced by a technical term that can be properly understood by those skilled in the art. In addition, general terms used in the description of the present disclosure should be construed according to definitions in dictionaries or according to the context, and should not be construed in an excessively restrained manner.

A singular representation may include a plural representation unless the context clearly indicates otherwise. It will be understood that the terms 'comprising', 'include', etc., when used in this specification, specify the presence of several components or several steps and part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Exemplary embodiments of the present invention will be described below in detail with reference to the accompanying drawings in which the same reference numbers are used throughout this specification to refer to the same or like parts. In describing the present invention, a detailed description of known functions and configurations will be omitted when it may obscure the subject matter of the present invention. The accompanying drawings are used to help easily understood the technical idea of the present invention and it should be understood that the idea of the present invention is not limited by the accompanying drawings. The idea of the present invention should be construed to extend to any alterations, equivalents and substitutions besides the accompanying drawings.

Although the term 'terminal' is illustrated in the drawings, the terminal may be called a User Equipment (UE), a Mobile Equipment (ME), or a Mobile Station (MS). The terminal may be a type of portable equipment having a communication function, such as a laptop, a cellular phone, a Personal Digital Assistant (PDA), a smart phone, and a multimedia device, or may be a type of fixed equipment, such as a PC and a vehicle-mounted device.

In general, the base station (BS) may be a fixed station that communicates with the UE and may be referred to as other terms such as NodeB, Base Transceiver System (BTS), Access Point (AP), or the like. One or more cells may exist in one base station (BS).

The embodiments of the present invention will hereinafter be described with reference to the attached drawings. However, the following description will focus upon the method proposed by the present invention, and the remaining contents will herein be omitted for convenience of description. However, although some contents will be omitted from the following description for convenience of description, the omitted contents are not excluded from the scope or spirit of the present invention, and should be construed to be included in the present invention.

FIG. 1 is a conceptual diagram illustrating an interference channel for use in a cellular network.

A cellular network composed of Cell (a) managed by a base station a ($200a$) and Cell (b) managed by a base station b ($200b$) is shown in FIG. 1. Although the embodiment considers only the cellular network composed of two cells, this embodiment can be easily extended to a general cellular network composed of a plurality of cells. In addition, this embodiment first considers the cellular uplink, and the present invention can also be applied to the cellular downlink.

K users are present in each cell. Each user transmits a data stream using a N-dimension signal space. In the following description, the term 'user" may refer to a user equipment (UE).

(N×1) beamforming vector of a k-th user located in the cell (a) is denoted by $v_{ak}$, and (N×1) reception vector for estimating data of the k-th user by the BS a ($200a$) is denoted by $g_{ak}$. Likewise, the beamforming vector of the k-th user of the cell (b) is denoted by $v_{bk}$, and the reception vector for estimating the k-th user data by the BS b ($200b$) is denoted by $g_{bk}$.

A channel from the k-th user of the cell a to the BS of the cell a is denoted by $H_{ak}^a$, and an interference channel from the k-th user of the cell a to the BS of the cell b is denoted by $H_{ak}^b$. Likewise, a channel from the k-th user of the cell b to the BS of the cell b is denoted by $H_{bk}^b$, and an interference channel from the k-th user of the cell b of the BS of the cell a is denoted by $H_{bk}^a$.

In this case, all channel matrices are (N×N) diagonal matrices. A representative example of the channel matrix is that a transceiver uses a single antenna and uses a symbol extension in a frequency domain or a time domain.

Users present in the cell (a) so as to satisfy an interference alignment may be denoted by the following equation 1.

$$H_{a1}^b v_{a1} = H_{a2}^b v_{a2} = \ldots = H_{aK}^b v_{aK} = r^b \quad \text{[Equation 1]}$$

Equation 1 represents a specific condition in which signals transmitted from users located in the cell (a) are arranged and received in a specific signal space $r^b$. If interference from users in cell (a) affecting users in cell (b) occupies only a one-dimensional vector space, a larger signal space for a desired signal can be guaranteed in the cell (b). In the case where the interference alignment is satisfied, the beamforming vector of the users of the cell (a) can be represented by the following equation 2.

$$v_{ak} = (H_{ak}^b)^{-1} r^b \quad \text{[Equation 2]}$$

In the case where each user located in the cell (a) uses the beamforming vector shown in Equation 2 for the interference alignment, there may arise interference between users located in the cell. That is, Equation 3 is generally achieved between a signal of the i-th user and a signal of the j-th user.

$$(H_{ai}^a v_{ai})^H (H_{aj}^a v_{aj}) \neq 0 \quad \text{[Equation 3]}$$

In Equation 3, $(\bullet)^H$ is a Hermitian transpose matrix of a certain matrix. If there is interference between users located in the cell, it is impossible to guarantee performance of each user due to the occurrence of interference, resulting in reduction of throughput. In order to solve this problem, there is a need to search for a specific condition in which the conventional interference alignment condition is satisfied and there is no interference between signals of users located in the cell.

$$H_{a1}^b v_{a1} = H_{a2}^b v_{a2} = \ldots = H_{aK}^b v_{aK} = r^b$$

$$(H_{ai}^a v_{ai})^H (H_{aj}^a v_{aj}) = 0 \text{ for all } i \neq j \quad \text{[Equation 4]}$$

The interference alignment method according to a first embodiment will hereinafter be described with reference to FIGS. 2 to 5.

Figure 2:
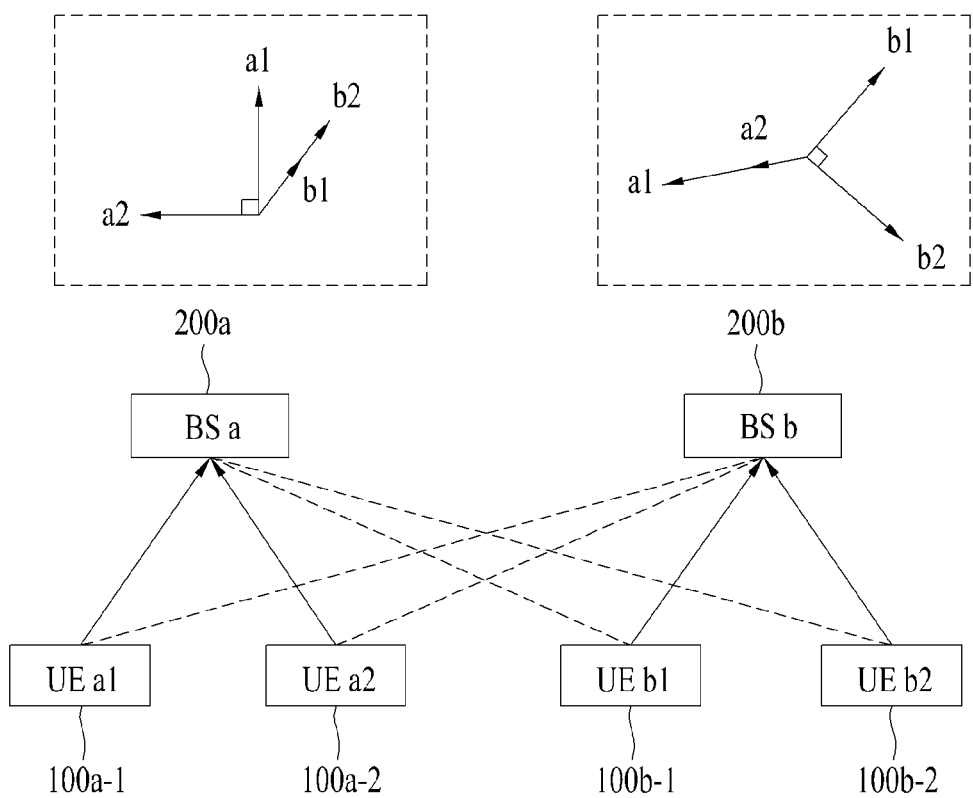
FIG. 2 is a conceptual diagram illustrating interference alignment (IA) according to a first embodiment of the present invention.

FIG. 2 is a conceptual diagram illustrating interference alignment (IA) according to a first embodiment of the present invention.

As can be seen from FIG. 2, the interference alignment is achieved with no interference between users located in the cell. An example of the reception signal space for satisfying the condition of Equation 4 is shown in FIG. 2, and the reception signal space includes two users per cell. A first equation of Equation 4 is denoted by $v_{ak} = (H_{ak}^b)^{-1} r^b$. If the first equation is substituted into a second equation of Equation 4, the following Equation 5 can be obtained.

$$(H_{ai}^a (H_{ai}^b)^{-1} r^b)^H (H_{aj}^a (H_{aj}^b)^{-1} r^b) = 0 \; \forall (i,j), i \neq j \quad \text{[Equation 5]}$$

Since each channel matrix is a diagonal matrix, the Equation 5 can be used along with the following equation 6.

$$[\text{diag}\{(H_{ai}^a (H_{ai}^b)^{-1})^H (H_{aj}^a (H_{aj}^b)^{-1})\}][r^b \odot (r^b)^*] = 0 \quad \text{[Equation 6]}$$

for all $i \neq j$

In Equation 6, diag$\{\bullet\}$ is an operator for extracting only a diagonal component of the matrix so as to make a row vector. If Equation 6 is arranged for all values (i, j), the following equation 7 can be achieved.

$$\begin{bmatrix} \text{diag}\{(H_{a1}^a(H_{a1}^b)^{-1})^H (H_{a2}^a(H_{a2}^b)^{-1})\} \\ \text{diag}\{(H_{a1}^a(H_{a1}^b)^{-1})^H (H_{a3}^a(H_{a3}^b)^{-1})\} \\ \ldots \\ \ldots \\ \text{diag}\{(H_{aK}^a(H_{aK}^b)^{-1})^H (H_{a(K-1)}^a(H_{a(K-1)}^b)^{-1})\} \end{bmatrix} [r^b \odot (r^b)^*] = 0 \quad \text{[Equation 7]}$$

In Equation 7, a matrix multiplied by the front part is denoted by K(K−1)/2×N matrix. $r^b \odot (r^b)^*$ elements are positive (+) integers, such that Equation 7 can also be denoted by the following equation 8.

$$\begin{bmatrix} \text{real}\{\text{diag}\{(H_{a1}^a(H_{a1}^b)^{-1})^H (H_{a2}^a(H_{a2}^b)^{-1})\}\} \\ \text{imag}\{\text{diag}\{(H_{a1}^a(H_{a1}^b)^{-1})^H (H_{a2}^a(H_{a2}^b)^{-1})\}\} \\ \text{real}\{\text{diag}\{(H_{a1}^a(H_{a1}^b)^{-1})^H (H_{a3}^a(H_{a3}^b)^{-1})\}\} \\ \text{imag}\{\text{diag}\{(H_{a1}^a(H_{a1}^b)^{-1})^H (H_{a3}^a(H_{a3}^b)^{-1})\}\} \\ \ldots \\ \ldots \\ \text{real}\{\text{diag}\{(H_{aK}^a(H_{aK}^b)^{-1})^H (H_{a(K-1)}^a(H_{a(K-1)}^b)^{-1})\}\} \\ \text{imag}\{\text{diag}\{(H_{aK}^a(H_{aK}^b)^{-1})^H (H_{a(K-1)}^a(H_{a(K-1)}^b)^{-1})\}\} \end{bmatrix} \quad \text{[Equation 8]}$$

$$[r^b \odot (r^b)^*] = 0$$

In Equation 8, real$\{\bullet\}$ is an operator for extracting only a real number component of the matrix, and imag$\{\bullet\}$ is an operator for extracting an imaginary number of the matrix. In Equation 8, a matrix multiplied by the front part is denoted by K(K−1)×N matrix, such that a condition in which there is a null space of this matrix is K(K−1)<N. If any one of (N, K) values satisfying the above condition is more advantageous than the conventional frequency division access or time division access in terms of a transfer rate, i.e., in case of K>(N/2), (N,K)=(3,2) is unique. In case of (N,K)=(3,2), Equation 8 can also be used to search for $r^b$ that satisfies the following equation 9.

$$\begin{bmatrix} \text{real}\{\text{diag}\{(H_{a1}^a(H_{a1}^b)^{-1})^H (H_{a2}^a(H_{a2}^b)^{-1})\}\} \\ \text{imag}\{\text{diag}\{(H_{a1}^a(H_{a1}^b)^{-1})^H (H_{a2}^a(H_{a2}^b)^{-1})\}\} \end{bmatrix} [r^b \odot (r^b)^*] = 0 \quad \text{[Equation 9]}$$

Figure 3:
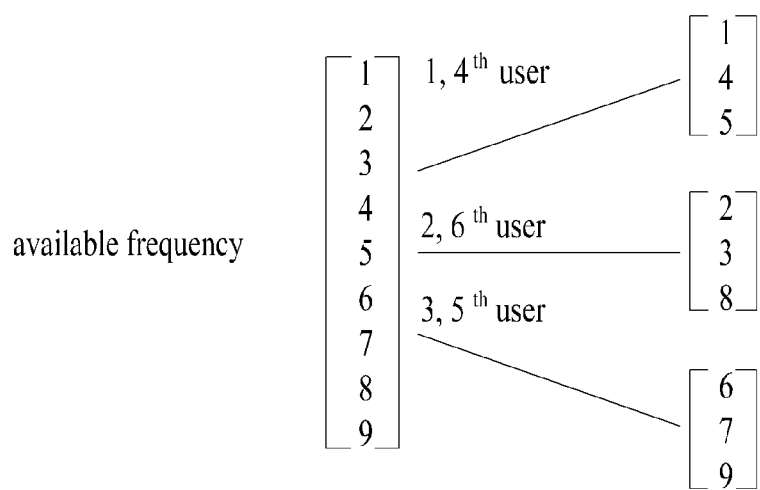
FIG. 3 is a conceptual diagram illustrating a method for distributing a signal space and a user for interference alignment (IA) according to a first embodiment of the present invention.

FIG. 3 is a conceptual diagram illustrating a method for distributing a signal space and a user for interference alignment (IA) according to a first embodiment of the present invention.

In Equation 9, the matrix multiplied by the front part is a (2×3) matrix, and the (2×3) matrix has one-dimensional null vector. However, since all elements of the null vector should be positive integers, $r^b$ satisfying the Equation 9 is not always present. For example, when elements of all channel matrices are generated as a Gaussian random variable, the probability of generating $r^b$ is merely 25%. That is, a method for performing interference alignment with no interference between users located in the cell has disadvantages in which (N, K) is present only in the case of (3, 2) and (N, K) is present with a relatively low probability in the case of (3, 2).

In order to solve the above problem, a signal space for transmission/reception is divided into a plurality of signal spaces each having the size of 3, and two users are properly arranged in each signal space having the size of 3.

As described above, there are a variety of methods for dividing a signal space and arranging each user. One method in which signals of two users arranged in two divided signals are orthogonal to each other and an interference alignment is possible is selected from among the above-mentioned methods. In this case, signals of all users located in the cell are orthogonal to each other and causes interference alignment.

For example, if (N, K) is set to (6, 4), (6, 4) may be divided into two (3, 2) parts. If (N, K) is set to (9, 6), (9, 6) may be divided into three (3, 2) parts. If this scheme is generalized, (3L, 2L) can be divided into L (3, 2) parts. For example, if (N, K) is set to (9, 6), (9, 6) may be divided into three (3, 2) parts as described above. If the signal space is divided into some frequency bands, N may be denoted by the number of available subcarriers.

FIGS. 4A and 4B are conceptual diagrams illustrating a method for distributing signal spaces and users for interference alignment (IA) according to a first embodiment of the present invention.

FIG. 4A shows an appropriate example in which a total signal space is divided into two parts and two users are distributed to each signal space. FIG. 4B shows an inappropriate example thereof.

The following description will disclose the case of (N, K)=(6, 4). That is, four users are exemplarily arranged in a signal space having the size of 6. Assuming that elements of all channel matrices are denoted by real numbers for convenience of description and better understanding of the present invention, the matrix multiplied by the front part of the Equation 8 can be represented by the following equation 10.

$$\begin{bmatrix} 2 & 1 & -3 & -1 & -2 & -3 \\ 1 & -1 & 4 & 7 & -1 & -2 \\ 7 & 1 & -3 & 1 & 2 & 3 \\ 6 & -1 & -2 & -1 & 9 & -3 \\ 3 & 1 & 3 & 3 & -2 & -8 \\ -5 & 1 & -4 & -6 & -1 & 3 \end{bmatrix}$$ [Equation 10]

In this case, if two users are distributed to two signal spaces each having the size of 3 as shown in FIG. 3, users of each user space does not cause interference, and interference alignment can be achieved.

However, as can be seen from User 1 and User 4 shown in FIG. 4b, interference alignment (IA) cannot be achieved without generating interference between the user 1 and user 4, as vector [1, 2, 3] shown in FIG. 4b does not include a null vector that has a positive real number as an element.

Assuming that an arbitrary (N, K) is given in a cellular network composed of two cells, a specific condition capable of performing interference alignment without considering interference between users located in the cell is denoted by N≥(K+1). In accordance with the embodiment of the present invention, N≥(3K/2) must be satisfied for an interference alignment having no interference between users located in the cell. The number of available users per cell according to the embodiment is lower than the number of available users per cell in the conventional interference alignment method. However, if the above-mentioned condition is compared with the condition N≥(3K/2) needed for a general frequency division access or time division access, the number of available users per cell is higher than those of the general frequency division access or time division access. In addition, even in the case of (N, K) that does not satisfy N≥(3K/2), if a signal space is divided into a plurality of parts, the interference alignment method of the present invention can be partially used.

If (N, K) is set to (3, 2), although the probability of using the interference alignment method of the present invention is about 25%, the probability is gradually increased in proportion to (N, K). For example, assuming that elements of a channel are generated as Gaussian random variables, the above-mentioned probability is sequentially increased to 25%, 80%, 99.7%, and 100% in the order of (3, 2), (6, 4), (9, 6), and (12, 8), respectively.

If (N, K) is given, the interference alignment (IA) method can be used not only on the condition that K is not identical to the number of users per cell, but also on the condition that K is the sum of streams transmitted from users per cell. For example, if the number of users per cell is fixed to 2, it is considered that each user transmits K/2 streams. In this case, the probability of performing interference alignment with no interference between users is gradually increased in proportion to K.

Figure 5A:
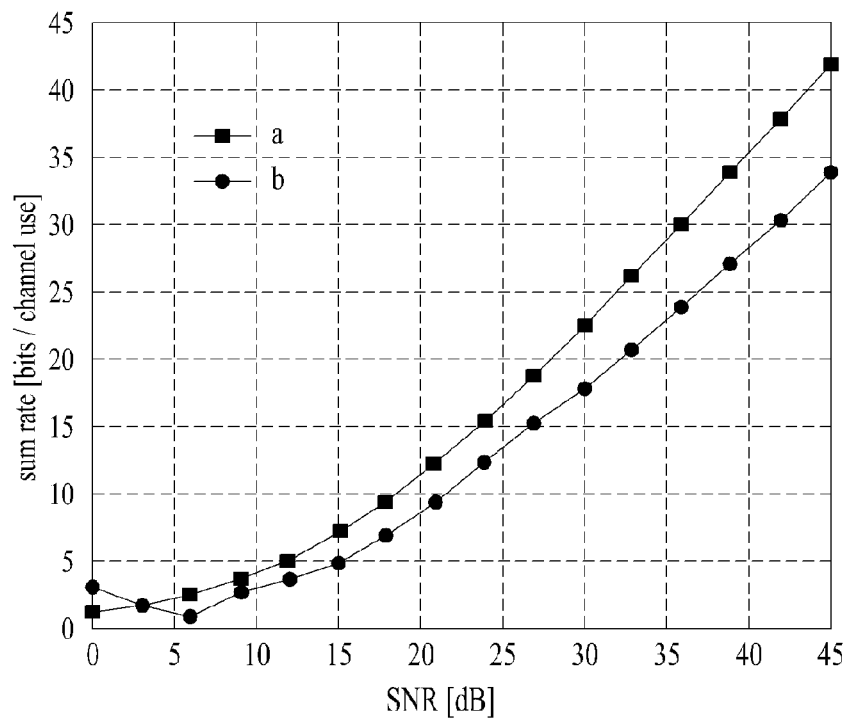
FIGS. 5A and 5B are conceptual diagrams illustrating an SNR to total transfer rate throughput according to a first embodiment of the present invention.
Figure 5B:
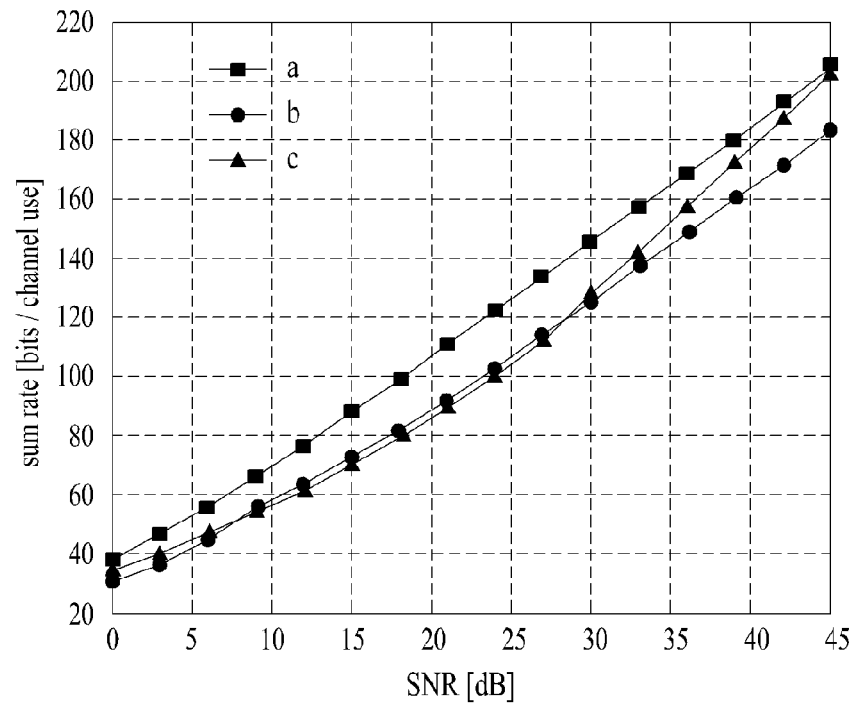

FIGS. 5A and 5B are conceptual diagrams illustrating an SNR to total transfer rate throughput according to a first embodiment of the present invention.

FIG. 5A shows a graph illustrating the comparison result in throughput between the interference alignment method of the present invention and the conventional interference alignment method under the condition that (N, K) is set to (3, 2). In FIG. 5A, (a) shows throughput obtained when the interference alignment method of the present invention is used, and (b) shows throughput obtained when the conventional interference alignment is used. It can be recognized that the interference alignment (IA) method of the present invention has a totally high transfer rate.

FIG. 5B shows a graph illustrating the comparison result in throughput between the interference alignment method of the present invention and the conventional interference alignment method under the condition that (N, K) is set to (9, 6). In FIG. 5B, (a) shows throughput obtained when the interference alignment method of the present invention is used, (b) shows throughput obtained when the conventional interference alignment is used, and (c) shows throughput obtained when the conventional interference alignment method is used under (N, K)=(9, 8). If N=9, the conventional interference alignment (IA) method can perform such interference alignment even in the case of K=8 under N=9, such that the above-mentioned throughput comparison is needed. It can be recognized that the interference alignment (IA) method of the present invention has a higher transfer rate throughput than the conventional interference alignment (IA) method.

The interference alignment (IA) method according to a second embodiment will hereinafter be described with reference to FIGS. 6 and 7.

FIG. 6 is a flowchart illustrating a method for generating a beamforming vector for interference alignment according to a second embodiment of the present invention.

FIG. 6 shows the method for performing interference alignment simultaneously while minimizing interference between users of the cell. The following interference alignment method can also be applied to general matrices obtained when channel matrices $H_{ak}^a$, $H_{ak}^b$, $H_{bk}^a$, and $H_{bk}^a$ are diagonal matrices.

The case of (N, K)=(3, 2) indicates that there is a low possibility of causing the interference alignment (IA) method. If (N, K) is high in level, this high (N, K) can search for a specific condition in which elements of a null vector of the matrix associated with a channel are denoted by positive real numbers, and then solve the problem caused by the specific condition. However, in order to search for a situation having a specific condition, the presence or absence of the specific condition must be checked on the condition that a combination between a user and a frequency is changed one by one, such that a large number of calculation times are needed.

Therefore, the present invention proposes a method for maximally removing interference between users of the cell although signals of the users of the cell are not accurately orthogonal to each other during signal reception. This method can be applied to the case in which it is difficult for the IA technology based on a signal space and a user distribution to be applied to the high (N, K).

The BS 200a and the BS 200b arbitrarily initialize $r^a$ indicating a signal space in which interference signals are to be arranged in the cell (a), $r^b$ indicating a signal space in which interference signals are to be arranged in the cell (b), and the beamforming vector of each user in step S801. Thereafter, the BS generates a reception signal space matrix on the basis of signals of users located in the cell (a) in step S802. That is, the BS generates the reception signal space matrix on the basis of the initialized beamforming vector and a channel matrix of a channel ranging from each UE of a serving cell of the BS to the BS in step S802. In this case, the reception signal space matrix is a matrix for calculating an orthogonal vector orthogonal to all reception signals by adding all reception signals. The reception signal space matrix may be denoted by $G_a$. In this case, the following equation 11 may be used to generate the above reception signal space matrix.

$$G_a = [H_{a1}^a v_{a1}, H_{a2}^a v_{a2}, \ldots, H_{aK}^a v_{aK}]$$ [Equation 11]

The BS may also generate the matrix $G_b$ using the above-mentioned method.

The BS performs QR decomposition of the reception signal space matrix $G_a$ generated by Equation 11 into an orthogonal matrix (for example, Q matrix) and an upper triangular matrix in step S803. In this case, the following equation 12 may be used.

$$G_a = Q_a R_a$$ [Equation 12]

In Equation 12, a first column to a K-th column of the orthogonal matrix $Q_a$ denotes orthogonal vectors indicating a signal space occupied by $G_a$ columns, i.e., a signal space occupied by signals of users of the cell (a). In this case, the BS makes a user vector $z_{ak}$ for the K-th user using the K-th column $Q_a(:,K)$ in step S804. That is, the BS generates a user vector on the basis of the decomposed orthogonal matrix and the channel matrix. In this case, the following equation 13 may be used.

$$z_{ak}(H_{ak}^a)^{-1}Q_a(:,k)$$ [Equation 13]

The BS generates another vector $z_{bk}$ using the above-mentioned method.

If the BS uses the vector $Z_{ak}$ as a beamforming vector of the K-th user, signals of the users located in the cell are orthogonal to each other so that there arises no interference between the signals of the users, but it is impossible to satisfy the interference alignment condition. Therefore, the BS updates the beamforming vector that maximally approximates the user vector $z_{ak}$ and satisfies the interference alignment in step S805. That is, the beamforming vector is updated on the basis of the user vector and the signal space ( ). In this case, the following equation 14 may be used as follows.

$$v_{ak} = (H_{ak}^b)^{-1} \frac{(r^b)^H (H_{ak}^b z_{ak})}{(r_b)^H r^b} r^b$$ [Equation 14]

Figure 8:
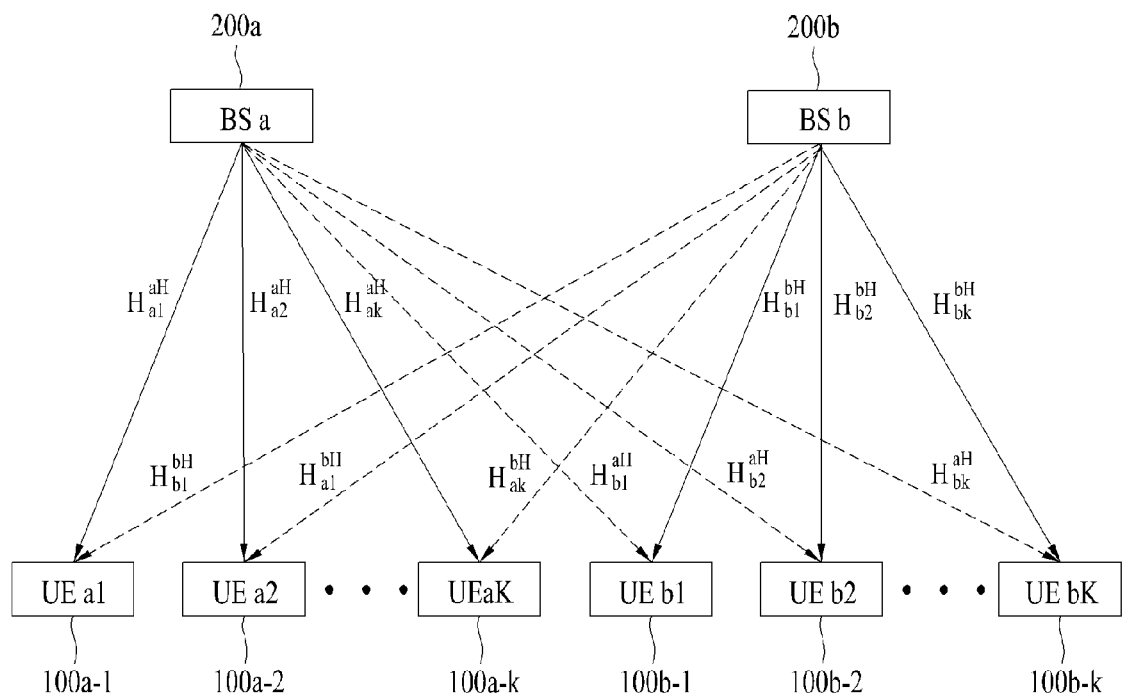
FIG. 8 is a conceptual diagram illustrating a reciprocal channel of a conventional channel assumed to update a beamforming vector and a reception vector for use in a cellular network.

The Equation 14 is configured to perform projection of the vector $z_{ak}$ toward the interference alignment space. The BS may update the beamforming vector $v_{bk}$ using the above-mentioned method. Thereafter, the BS may determine whether the updated transmission vectors converge on a predetermined range in step S806. According to the decision result, the BS may repeatedly perform the steps S802 to S805 using the generated beamforming vectors in step S805. FIG. 8 is a conceptual diagram illustrating a method for obtaining a beamforming vector using the above-mentioned repeated calculation.

In the above-mentioned method for updating the beamforming vector, a specific part requesting the highest calculation complexity is a QR decomposition part of the matrix. If (N, K) is given, the calculation complexity requisite for QR decomposition when calculating the beamforming vector is denoted by $O(NK^2)$. Although $O(NK^2)$ is higher than $O(NK)$ serving as calculation complexity needed for general interference alignment, $O(NK^2)$ is very lower than $O(NK^3)$ of the Max-SINR algorithm having a very good performance.

Figure 7A:
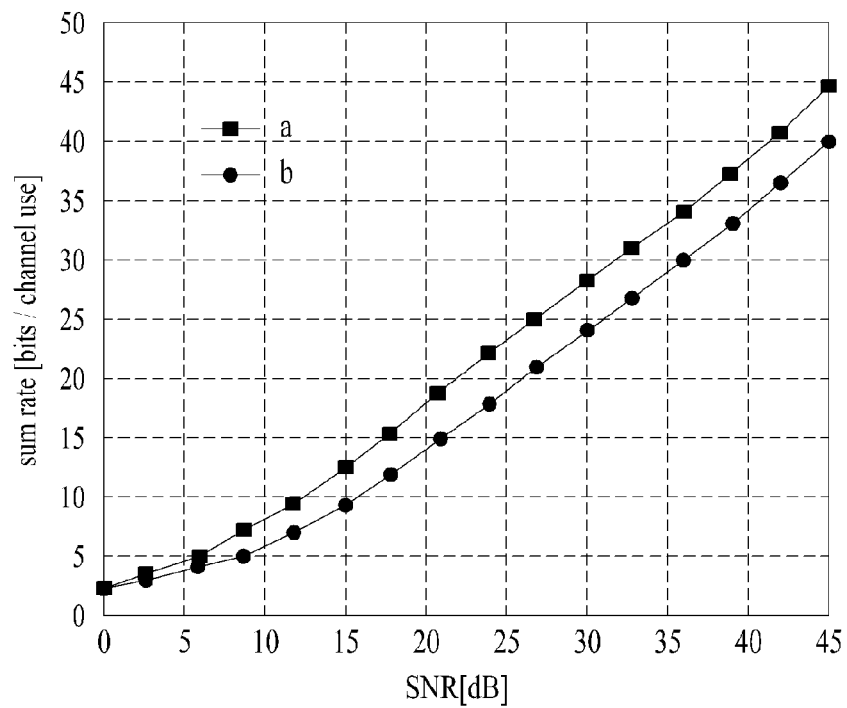
FIGS. 7A and 7B are graphs illustrating an SNR to total transfer rate throughput according to a second embodiment of the present invention.
Figure 7B:
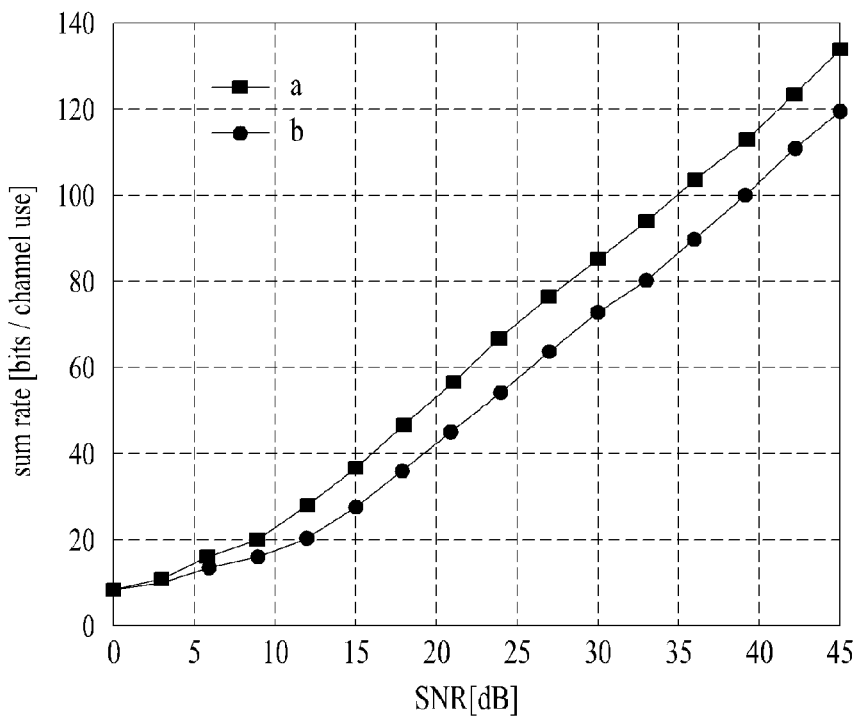

FIGS. 7A and 7B are graphs illustrating an SNR to total transfer rate throughput according to a second embodiment of the present invention.

FIG. 7A is a graph showing the comparison result in throughput between the interference alignment (IA) method through repeated beamforming vector improvement and the conventional interference alignment (IA) method in the case of (N, K)=(3, 2). In FIG. 7A, (a) shows throughput obtained when the interference alignment (IA) method through repeated beamforming vector improvement of the present invention is used, and (b) shows throughput obtained when the conventional interference alignment (IA) method is used. Referring to FIG. 7A, the interference alignment (IA) method of the present invention has a totally high transfer rate.

FIG. 7b is a graph showing the comparison result in throughput between the interference alignment (IA) method through repeated beamforming vector improvement and the conventional interference alignment (IA) method in the case of (N, K)=(9, 6). In FIG. 7B, (a) shows throughput obtained when the interference alignment (IA) method through repeated beamforming vector improvement of the present invention is used, and (b) shows throughput obtained when the conventional interference alignment (IA) method is used. Referring to FIG. 7B, the interference alignment (IA) method of the present invention has a totally high transfer rate.

The interference alignment (IA) method according to a third embodiment of the present invention will hereinafter be described with reference to FIGS. 8 to 10.

Referring to FIG. 1, a cellular network composed of Cell (a) managed by a base station a (200a) and Cell (b) managed by a base station b (200b) is shown in FIG. 1. Although the embodiment considers only the cellular network composed of two cells, this embodiment can be easily extended to a general cellular network composed of a plurality of cells. In addition, this embodiment first considers the cellular uplink, and the present invention can also be applied to the cellular downlink.

K users are present in each cell. The k-th user (100a-k) present in the cell (a) transmits a data symbol $x_{ak}$ using the beamforming vector $v_{ak}$. The BS a (200a) may use the reception vector $g_{ak}$ to estimate data of the k-th user. Likewise, the k-th user (100b-k) of the cell (b) transmits a data symbol $x_{bk}$ using the beamforming vector $v_{bk}$. The BS b (200b) may use the reception vector $g_{bk}$ to estimate data of the k-th user.

Although the embodiment assumes that each user transmits one data stream, this embodiment can also be applied to the case in which respective users transmit a plurality of data streams.

A channel ranging from the k-th user of the cell (a) to the BS (a) is denoted by $H_{ak}^a$, and an interference channel ranging from the k-th user of the cell (a) to the BS (b) is denoted by $H_{ak}^b$. Likewise, a channel ranging from the k-th user of the cell (b) to the BS (b) is denoted by $H_{bk}^b$, and an interference channel ranging from the k-th user of the cell (b) to the BS (a) is denoted by $H_{bk}^a$. Therefore, a signal received by the BS (a) may be represented by $y^a$ shown in the following equation 15, and a signal received by the BS (b) may be represented by $y^b$ shown in the following equation 15.

$$y^a = \sum_{k=1}^{K} H_{ak}^a v_{ak} x_{ak} + \sum_{k=1}^{K} H_{bk}^a v_{bk} x_{bk} + w^a \qquad [\text{Equation 15}]$$

$$y^b = \sum_{k=1}^{K} H_{bk}^a v_{bk} x_{bk} + \sum_{k=1}^{K} H_{ak}^b v_{ak} x_{ak} + w^b$$

In Equation 15, $w^a$ is a vector indicating a noise component observed by the BS (a), and $w^b$ is a vector indicating a noise component observed by the BS (b). It is assumed that $w^a$ and $w^b$ are configured to satisfy $E\{w_a w_a^H\} = E\{w_b w_b^H\} = \sigma^2 I$. The BS may use the reception vectors $g_{ak}$ and $g_{bk}$ to estimate a data symbol of each user as shown in the following equation 16.

$$x'_{ak} = g_{ak}^H y^a$$

$$x'_{bk} = g_{bk}^H y^b \qquad [\text{Equation 16}]$$

In Equation 16, $x'_{ak}$ is an estimated value of $x_{ak}$ for use in each BS, and $x'_{bk}$ is an estimated value of $x_{bk}$ for use in each BS. When all users transmit signals using specific beamforming vectors $v_{ak}$ and $v_{bk}$, reception vectors ($g_{ak}$ and $g_{bk}$) satisfying a minimum mean-squared error (MMSE) are represented by the following equation 17.

$$g_{ak} = \left( \sum_{i=1}^{K} H_{ai}^a v_{ai} v_{ai}^H H_{ai}^{a\,H} + \sum_{j=1}^{K} H_{bj}^a v_{bj} v_{bj}^H H_{bj}^{a\,H} + \sigma^2 I \right)^{-1} H_{ak}^{a\,H} v_{ak} \qquad [\text{Equation 17}]$$

$$g_{bk} = \left( \sum_{i=1}^{K} H_{bi}^b v_{bi} v_{bi}^H H_{bi}^{b\,H} + \sum_{j=1}^{K} H_{aj}^b v_{aj} v_{aj}^H H_{aj}^{b\,H} + \sigma^2 I \right)^{-1} H_{bk}^{b\,H} v_{bk}$$

FIG. 8 is a conceptual diagram illustrating a reciprocal channel of a conventional channel assumed to update a beamforming vector and a reception vector for use in a cellular network.

Although each user actually transmits a signal and the BS actually receives the signal from the user, it may be assumed that the BS transmits the signal and each user receives the signal so as to calculate the beamforming vector and the reception vector as shown in FIG. 8. In this case, it is assumed that reciprocity of the channel is achieved, a channel ranging from the BS (a) to the k-th user of the cell (a) is denoted by $H_{ak}^{aH}$, and a channel ranging from the BS (a) to the k-th user of the BS (b) is denoted by $H_{bk}^{aH}$.

Likewise, a channel ranging from the BS (b) to the k-th user of the cell (b) is denoted by $H_{bk}^{bH}$, and a channel ranging from the BS (b) to the k-th user of the BS (b) is denoted by $H_{ak}^{bH}$. The reciprocal channel of the channel is mainly achieved when time division duplexing in which uplink and downlink are configured to use the same frequency band is used in the cellular network. FIG. 8 shows such channel configuration. On the assumption of such channel configuration, a signal received by each user may be represented by the following equation 18.

$$z_{ak} = \sum_{i=1}^{K} H_{ak}^{a\,H} g_{ai} x_{ai} + \sum_{j=1}^{K} H_{ak}^{b\,H} g_{bj} x_{bj} + u_{ak} \qquad [\text{Equation 18}]$$

$$z_{ak} = \sum_{i=1}^{K} H_{ak}^{a\,H} g_{ai} x_{ai} + \sum_{j=1}^{K} H_{ak}^{b\,H} g_{bj} x_{bj} + u_{ak}$$

When reception beamforming vectors used by individual users are respectively denoted by $v_{ak}$ and $v_{bk}$, the reception beamforming vectors ($v_{ak}$, $v_{bk}$) satisfying the MMSE condition can be represented by the following equation 19.

$$v_{ak} = \left( \sum_{i=1}^{K} H_{ak}^{a\,H} g_{ai} g_{ai}^H H_{ak}^a + \sum_{i=1}^{K} H_{ak}^{b\,H} g_{bj} g_{bj}^H H_{ak}^b + \sigma^2 I \right)^{-1} H_{ak}^{a\,H} g_{ak} \qquad [\text{Equation 19}]$$

$$v_{bk} = \left( \sum_{i=1}^{K} H_{bk}^{b\,H} g_{bi} g_{bi}^H H_{bk}^b + \sum_{i=1}^{K} H_{bk}^{a\,H} g_{aj} g_{aj}^H H_{bk}^a + \sigma^2 I \right)^{-1} H_{bk}^{b\,H} g_{bk}$$

Figure 9:
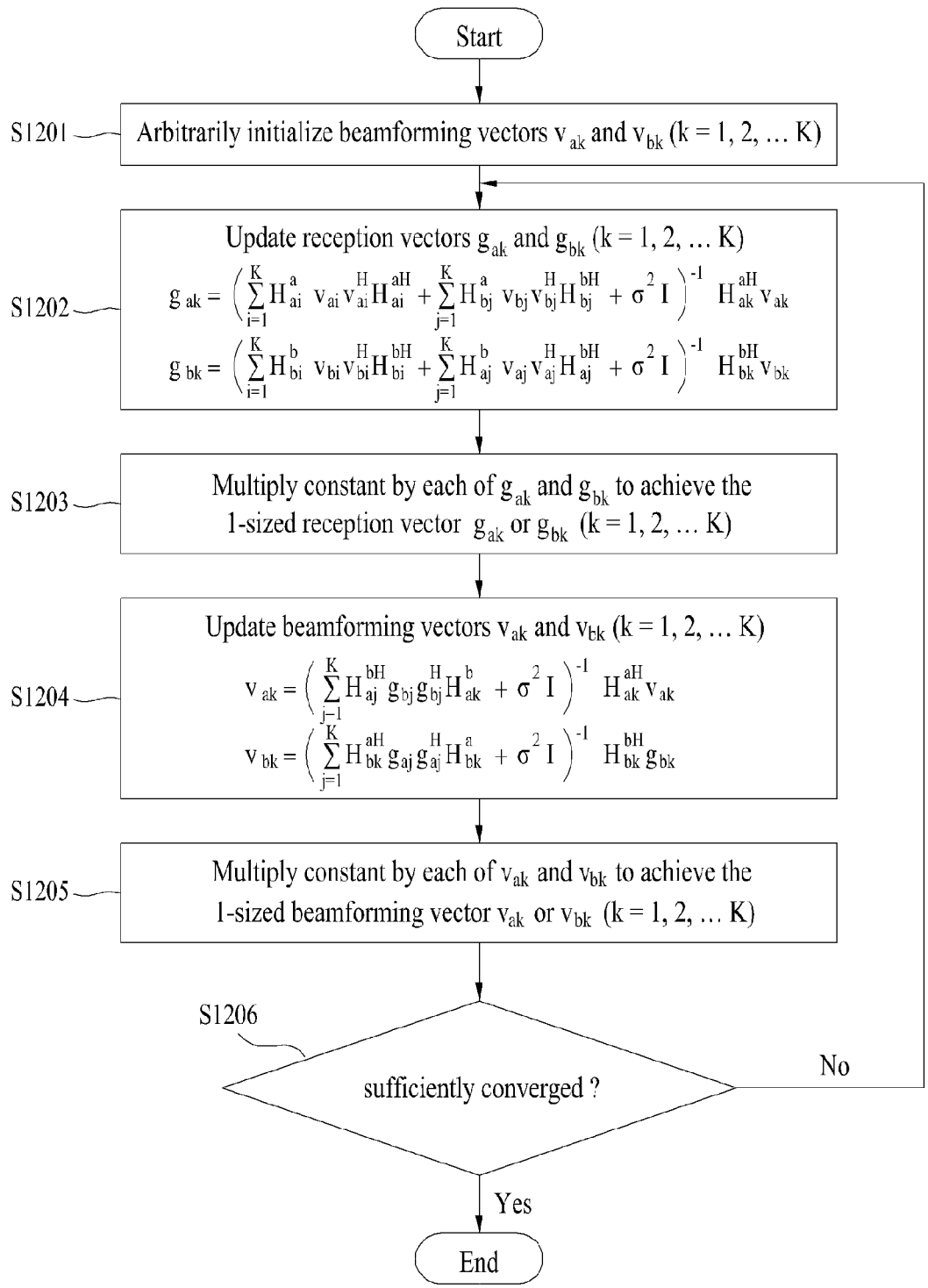
FIG. 9 is a flowchart illustrating a method for calculating a beamforming vector of each user for interference alignment according to a third embodiment of the present invention.

FIG. 9 is a flowchart illustrating a method for calculating a beamforming vector of each user for interference alignment according to a third embodiment of the present invention.

If the distributed interference alignment technology for use in the interference channel is directly extended to the cellular network, each user or each UE may decide the reception beamforming vector using the following method.

First, the UE arbitrarily decides the beamforming vector $v_{ak}$ and $v_{bk}$ in step S1201. Next, the BS may decide the reception vector $g_{ak}$ and $g_{bk}$ in step S1202. In this case, Equation 17 may be used. Next, the BS may perform normalization in a manner that each reception vector $g_{ak}$ or $g_{bk}$ has the size of 1 in step S1203. In step S1204, the UE may update the beamforming vectors $v_{ak}$ and $v_{bk}$ using the vectors $g_{ak}$ and $g_{bk}$ calculated in the step S1203. In this case, Equation 19 may be used. Next, the UE may perform normalization in a manner that $v_{ak}$ or $v_{bk}$ has the size of 1 in step S1205. Thereafter, the BS may update the vectors $g_{ak}$ and $g_{bk}$. In this case, the following equation 17 may be used. Thereafter, the BS may determine whether $v_{ak}$ and $v_{bk}$ have sufficiently converged in step S1206. The BS repeats the steps S1202 to S1205, and finally calculates the beamforming vectors $v_{ak}$ and $v_{bk}$.

If the distributed interference alignment technology is directly extended to the cellular network as described above, a process for updating the beamforming vector and the reception vector so as to search for the beamforming vectors ($v_{ak}$, $v_{bk}$) for interference alignment must be performed several times. This means that calculation complexity for searching the beamforming vectors ($v_{ak}$, $v_{bk}$) for interference alignment is very high in level. Therefore, the present invention may not update the beamforming vector according to Equation 19, and may update the beamforming vector using the following equation 20.

$$v_{ak} = \left( \sum_{j=1}^{K} H_{ak}^{b\,H} g_{bj} g_{bj}^{H} H_{ak}^{b} + \sigma^2 I \right)^{-1} H_{ak}^{a\,H} g_{ak}$$ [Equation 20]

$$v_{bk} = \left( \sum_{j=1}^{K} H_{bk}^{a\,H} g_{aj} g_{aj}^{H} H_{bk}^{a} + \sigma^2 I \right)^{-1} H_{bk}^{b\,H} g_{bk}$$

Unlike the beamforming vector update method of Equation 19, Equation 20 shows the MMSE filter type calculated after the UE disregards an interference signal generated from its own cell BS.

Figure 10:
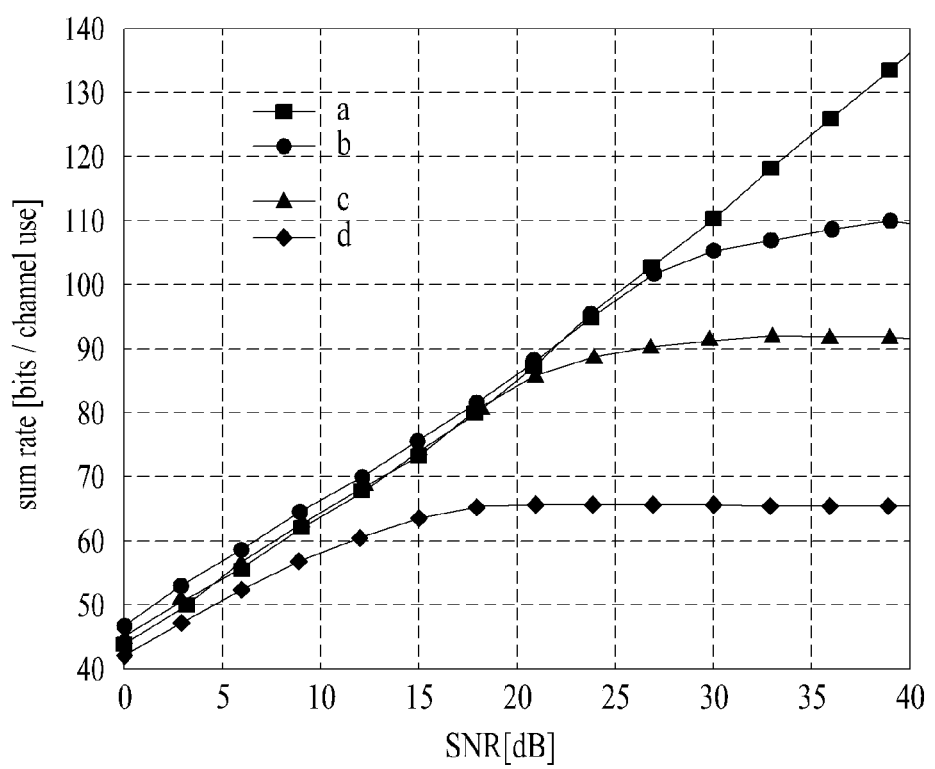
FIG. 10 is a graph illustrating an SNR to total transfer rate throughput according to a third embodiment of the present invention.

FIG. 10 is a graph illustrating an SNR to total transfer rate throughput according to a third embodiment of the present invention.

The graph of FIG. 10 shows the comparison result in sum-rate throughput based on SNR between one case in which the beamforming vector update method of the present invention is used and the other case in which the beamforming vector is updated by directly extending the distributed interference alignment technology for use in the interference channel. In this case, it is assumed that the number of users per cell in a cellular network composed of two cells is set to 4, and a channel ranging from each user to the BS is denoted by a (5×5) matrix. Elements of each channel matrix are generated at random according to Gaussian distribution having a mean value of zero (0). In FIG. 10, (a) shows that the beamforming vector update method is repeated ten times and calculated. In FIG. 10, (b) shows that the distributed interference alignment technology for use in the interference channel is directly extended such that the beamforming vector can be updated by repeating the distributed interference alignment technology 100 times, (c) shows that the distributed interference alignment vector is directly extended such that the beamforming vector is updated by repeating the distributed interference alignment technology 50 times, and (d) shows that the distributed interference alignment vector is directly extended such that the beamforming vector is updated by repeating the distributed interference alignment technology 10 times.

Referring to FIG. 10, it can be recognized that it is possible to search for the beamforming vector capable of obtaining a high sum-rate throughput using a smaller number of repeated calculations according to the beamforming vector update method of the present invention.

The interference alignment method according to a fourth embodiment of the present invention will hereinafter be described with reference to FIGS. 11 to 14.

Figure 11:
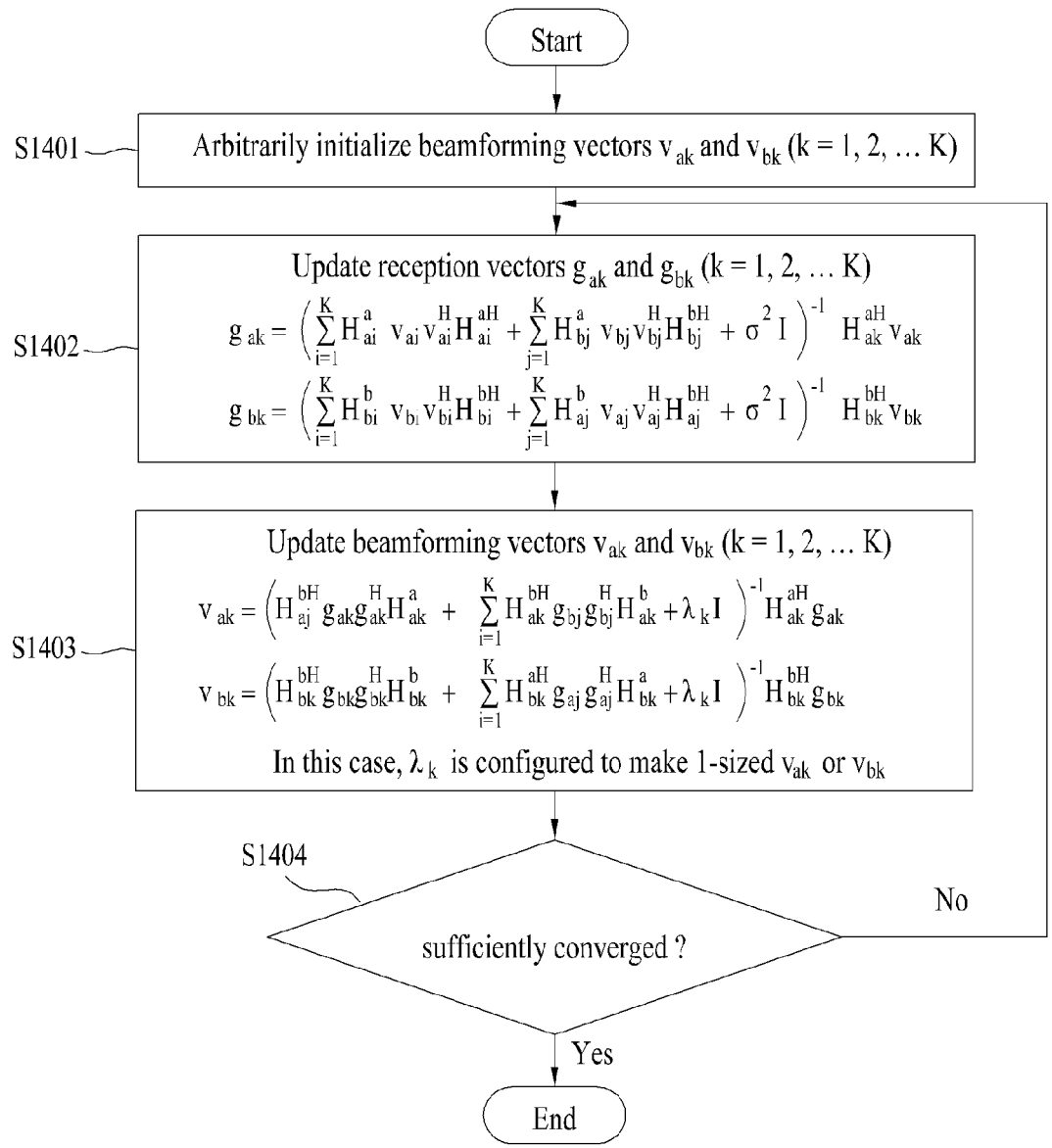
FIG. 11 is a flowchart illustrating a method for calculating a beamforming vector for interference alignment according to a fourth embodiment of the present invention.

FIG. 11 is a flowchart illustrating a method for calculating a beamforming vector for interference alignment according to a fourth embodiment of the present invention.

The steps of FIG. 11 are similar to those of FIG. 9.

In accordance with the embodiment of FIG. 11, when the distributed interference alignment technology for use in the interference channel is extended to the cellular network, the beamforming vector is not updated using the Equation 19, and the following equation 21 is used.

$$v_{ak} = \left( \sum_{i=1}^{K} H_{ak}^{a\,H} g_{ai} g_{ai}^{H} H_{ak}^{a} + \sum_{i=1}^{K} H_{ak}^{b\,H} g_{bj} g_{bj}^{H} H_{ak}^{b} + \lambda_{ak} I \right)^{-1}$$ [Equation 21]

$$H_{ak}^{a\,H} g_{ak}$$

$$v_{bk} = \left( \sum_{i=1}^{K} H_{bk}^{b\,H} g_{bi} g_{bi}^{H} H_{bk}^{b} + \sum_{i=1}^{K} H_{bk}^{a\,H} g_{aj} g_{aj}^{H} H_{bk}^{a} + \lambda_{bk} I \right)^{-1}$$

$$H_{bk}^{b\,H} g_{bk}$$

In Equation 21, $\lambda_{ak}$ is decided to satisfy $\|v_{ak}\|^2=1$, and $\lambda_{bk}$ is decided to satisfy $\|v_{bk}\|^2=1$. In this case, $\|v_{ak}\|^2$ is a decreasing function of the value $\lambda_{ak}$ and $\|v_{bk}\|^2$ is a decreasing function of the value $\lambda_{bk}$. The values ($\lambda_{ak}$, $\lambda_{bk}$) satisfying the above-mentioned conditions $\|v_{ak}\|^2=1$ and $\|v_{bk}\|^2=1$ can be found using the line search method such as the well-known bisection method or Newton method.

If the distributed interference alignment technology is extended to the cellular network using Equation 21, a large number of repeated calculations are needed in the same manner as in the case in which the beamforming vectors are updated using Equation 19. Therefore, the beamforming vector may be updated using the following equation 22 without updating the beamforming vector of Equation 21.

$$v_{ak} =$$ [Equation 22]

$$\left( H_{ak}^{a\,H} g_{ak} g_{ak}^{H} H_{ak}^{a} + \sum_{j=1}^{K} H_{ak}^{b\,H} g_{bj} g_{bj}^{H} H_{ak}^{b} + \lambda_{ak} I \right)^{-1} H_{ak}^{a\,H} g_{ak}$$

$$v_{bk} = \left( H_{bk}^{b\,H} g_{bk} g_{bk}^{H} H_{bk}^{b} + \sum_{j=1}^{K} H_{bk}^{a\,H} g_{aj} g_{aj}^{H} H_{bk}^{a} + \lambda_{bk} I \right)^{-1}$$

$$H_{bk}^{b\,H} g_{bk}$$

Equation 22 shows the MMSE filter type configured to disregard the interference signal generated from the BS of its own cell in a different way from the update method of Equation 21. $\lambda_{ak}$ is decided to satisfy $\|v_{ak}\|^2=1$, and $\lambda_{bk}$ is decided to satisfy $\|v_{bk}\|^2=1$. Unlike the method for modifying Equation 19 into Equation 20, when Equation 21 is modified into Equation 22, a desired signal component $H_{ak}^{aH} g_{ak} g_{ak}^{H} H_{ak}^{a}$ or $H_{bk}^{bH} g_{bk} g_{bk}^{H} H_{bk}^{b}$ generated from the BS of its own cell is included. When $\lambda_{ak}$ and $\lambda_{bk}$ are calculated, $\lambda_{ak}$ and $\lambda_{bk}$ may be calculated in different ways according to the presence or absence of such signal components, such that the desired signal component $H_{ak}^{aH} g_{ak} g_{ak}^{H} H_{ak}^{a}$ or $H_{bk}^{bH} g_{bk} g_{bk}^{H} H_{bk}^{b}$ may be included when Equation 21 is modified into Equation 22. Specifically, in the case of using the $\lambda_{ak}$ and $\lambda_{bk}$ values obtained when such signal components are not present, serious throughput deterioration may occur. Therefore, Equation 22 may require a signal component $H_{ak}^{aH} g_{ak} g_{ak}^{H} H_{ak}^{a}$ or $H_{bk}^{bH} g_{bk} g_{bk}^{H} H_{bk}^{b}$.

If the distributed interference alignment technology is directly extended to the cellular downlink, the beamforming vector may be updated using Equations 17 and 19, or the beamforming vector may be updated using Equations 17 and 21. However, if Equations 17 and 19 are used as shown in this embodiment, or if Equations 17 and 22 are used, it may be possible to more rapidly search for the beamforming vectors $g_{ak}$ and $g_{bk}$ in the cellular downlink.

Figure 12:
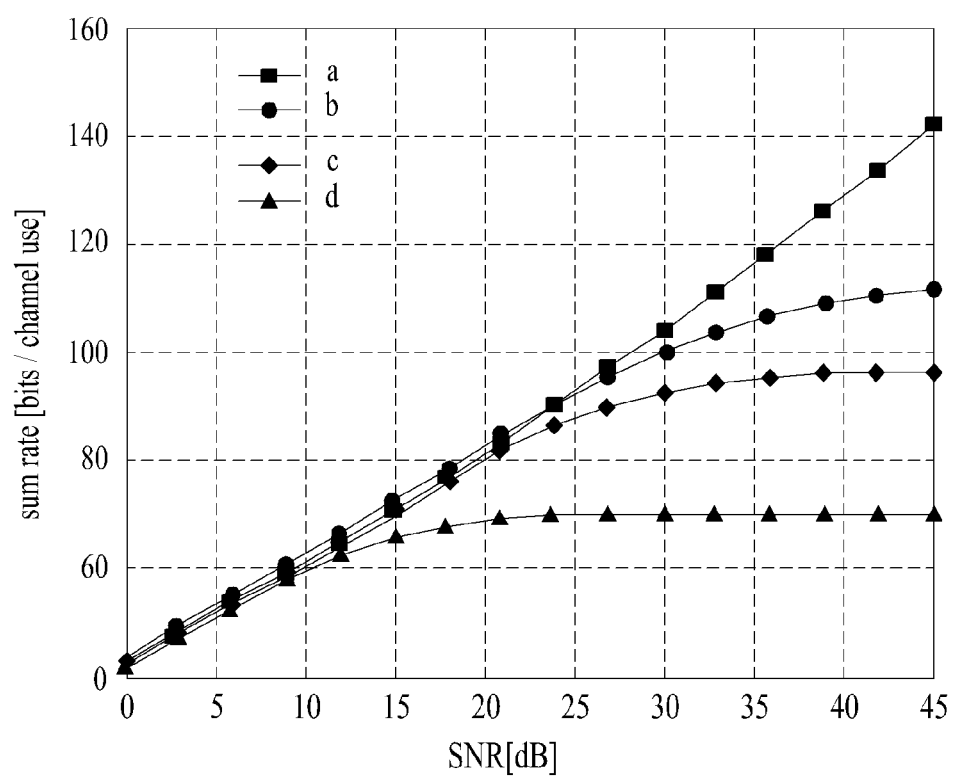
FIG. 12 is a graph illustrating an SNR to total transfer rate throughput on a cellular downlink according to a fourth embodiment of the present invention.

FIG. 12 is a graph illustrating an SNR to a total transfer rate throughput on a cellular downlink according to a fourth embodiment of the present invention.

The graph of FIG. 12 shows the comparison result in sum-rate throughput based on SNR between one case in which the beamforming vector update method of the present invention is used and the other case in which the beamforming vector is updated by directly extending the distributed interference alignment technology for use in the interference channel. In this case, it is assumed that the number of users per cell in a cellular network composed of two cells is set to 4, and a channel ranging from each user to the BS is denoted by a (5×5) matrix. Elements of each channel matrix are generated at random according to Gaussian distribution having a mean value of zero (0). In FIG. 12, (a) shows that the beamforming vector update method is repeated ten times and calculated using the Equation 20. In FIG. 12, (b) shows that the distributed interference alignment technology for use in the interference channel is directly extended using Equation 19 such that the beamforming vector can be updated by repeating the distributed interference alignment technology 50 times, (c) shows that the distributed interference alignment vector is directly extended using Equation 19 such that the beamforming vector is updated by repeating the distributed interference alignment technology 30 times, and (d) shows that the distributed interference alignment vector is directly extended using Equation 19 such that the beamforming vector is updated by repeating the distributed interference alignment technology 10 times. Referring to FIG. 12, it can be recognized that it is possible to search for the beamforming vector capable of obtaining a high sum-rate throughput using a smaller number of repeated calculations according to the beamforming vector update method of the present invention.

Figure 13:
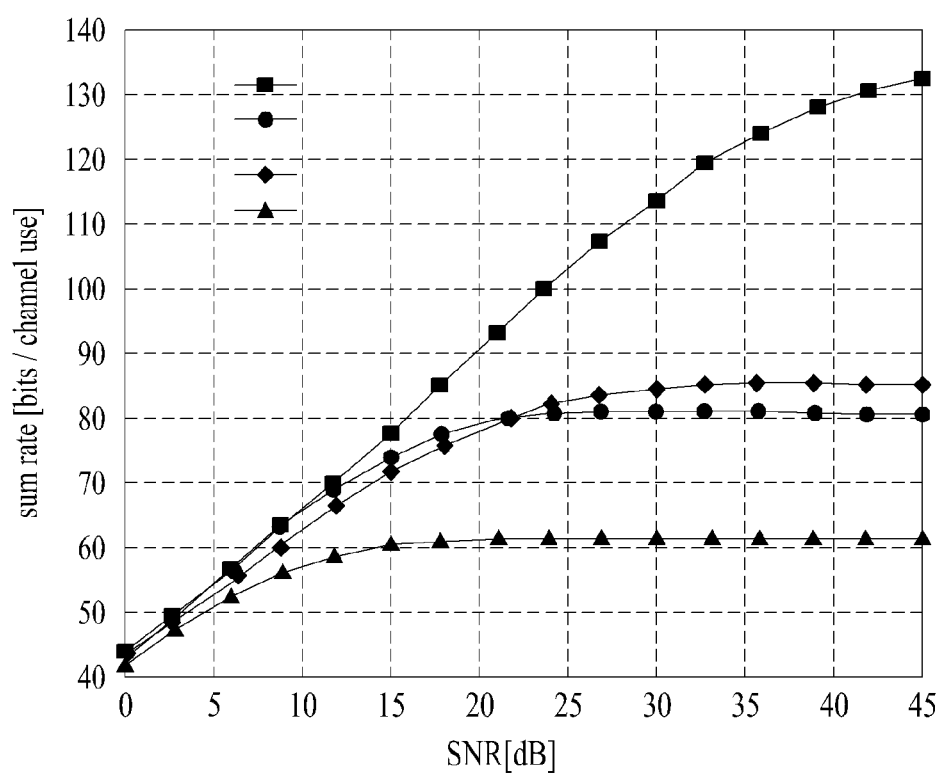
FIG. 13 is a graph illustrating an SNR to total transfer rate throughput on a cellular uplink according to a fourth embodiment of the present invention.

FIG. 13 is a graph illustrating an SNR to total transfer rate throughput on a cellular uplink according to a fourth embodiment of the present invention.

The graph of FIG. 13 shows the comparison result in sum-rate throughput based on SNR between one case in which the beamforming vector update method of the present invention is used and the other case in which the beamforming vector is updated by directly extending the distributed interference alignment technology for use in the interference channel. In this case, it is assumed that the number of users per cell in a cellular network composed of two cells is set to 4, and a channel ranging from each user to the BS is denoted by a (5×5) matrix. Elements of each channel matrix are generated at random according to Gaussian distribution having a mean value of zero (0). In FIG. 13, (a) shows that the beamforming vector update method is repeated 30 times and calculated using the Equation 22. In FIG. 13, (b) shows that the beamforming vector update method is repeated 10 times and calculated using the Equation 22. In FIG. 13, (c) shows that the distributed interference alignment technology for use in the interference channel is directly extended using Equation 21 such that the beamforming vector can be updated by repeating the distributed interference alignment technology 30 times, and (d) shows that the distributed interference alignment vector is directly extended using Equation 21 such that the beamforming vector is updated by repeating the distributed interference alignment technology 10 times. Referring to FIG. 13, it can be recognized that it is possible to search for the beamforming vector capable of obtaining a high sum-rate throughput using a smaller number of repeated calculations according to the beamforming vector update method of the present invention.

Figure 14:
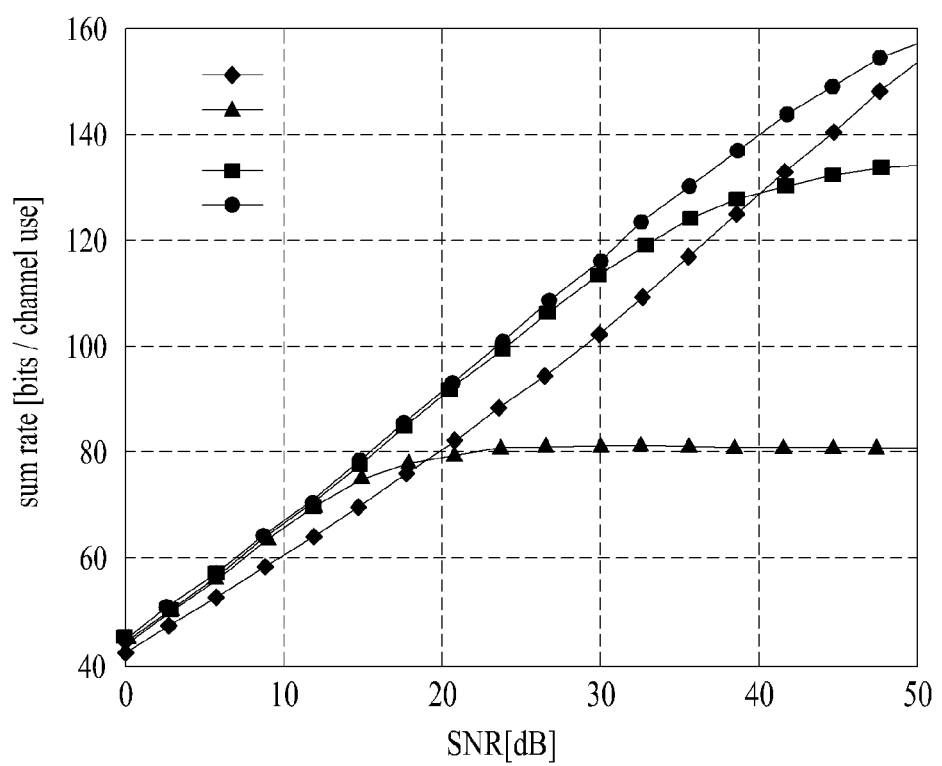
FIG. 14 is another graph illustrating an SNR to total transfer rate throughput on a cellular uplink according to a fourth embodiment of the present invention.

FIG. 14 is another graph illustrating an SNR to total transfer rate throughput on a cellular uplink according to a fourth embodiment of the present invention.

The graph of FIG. 13 shows the comparison result in sum-rate throughput between one case in which the beamforming vector update method based on Equation 20 is used and the other case in which the beamforming vector update method based on Equation 22 is used. In this case, it is assumed that the number of users per cell in a cellular network composed of two cells is set to 4, and a channel ranging from each user to the BS is denoted by a (5×5) matrix. Elements of each channel matrix are generated at random according to Gaussian distribution having a mean value of zero (0). In FIG. 13, (a) shows that the beamforming vector is repeatedly calculated ten times using the Equation 20. In FIG. 13, (b) shows that the beamforming vector is repeatedly calculated 10 times using the Equation 22, (c) shows that the beamforming vector is repeatedly calculated 30 times using the Equation 22, and (d) shows that the beamforming vector is repeatedly calculated 50 times using the Equation 22. Referring to FIG. 14, while the method based on Equation 20 has a higher throughput in terms of a lower number of calculation times, the method based on Equation 22 has a higher throughput in terms of not only a lower SNR but also a higher number of calculation times.

The interference alignment for use in the cellular network aligns interference received from users of other cells, instead of aligning signals transmitted from other users of its own cell. In order to quickly search for the transmission vector for interference alignment, the beamforming vector must be updated in such a manner that the lowest interference occurs in the BS located in another cell during updating of the beamforming vector. If the distributed interference alignment (IA) technology for use in the interference channel is directly extended to the cellular network, updating of the beamforming vector causes the lowest interference to other cells, and low interference occurs in signals of other users located in its own cell. In contrast, the beamforming vector update method according to the embodiment is carried out to cause a low interference toward the BS located in other cells, such that the beamforming vector capable of satisfying the interference alignment can be more quickly found.

The interference alignment (IA) method according to a fifth embodiment will hereinafter be described with reference to FIGS. 15 to 19.

In a MIMO channel including a plurality of users, the present invention proposes a method for making a precoding matrix for reducing interference between users.

The above-mentioned method is proposed to maximize a sum rate for use in an interference channel including a plurality of users. The interference alignment (IA) method through iterative information exchanging may have a low convergence speed, and the conventional method for obtaining the precoding matrix using the least square method uses an excessively restrictive interference alignment (IA) condition, such that it may have a low sum-rate.

Therefore, the present invention applies the least square method under the condition no restriction is added to the interference alignment (IA) condition, a signal space is maximally orthogonal to the interference space, and the precoding matrix can be obtained through the repeated calculation process.

Figure 15:
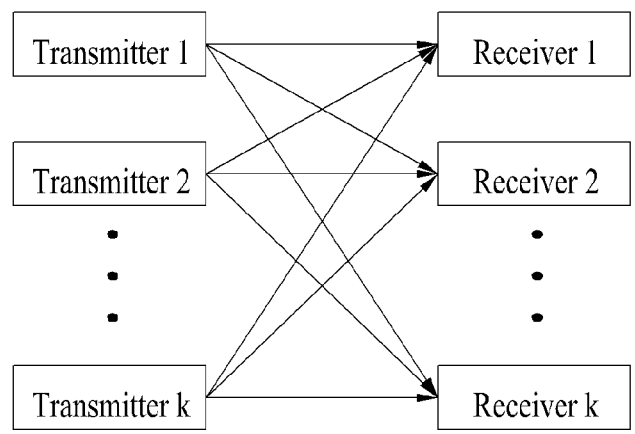
FIG. 15 is a block diagram illustrating a system configured to use an interference alignment (IA) according to embodiments of the present invention.

FIG. 15 is a block diagram illustrating a system configured to use an interference alignment (IA) according to embodiments of the present invention.

FIG. 15 is a conceptual diagram illustrating an interference channel when K users are present. As can be seen from FIG. 15, K transmitters and K receivers may exist, and each transmitter is configured to transmit signals to all receivers. In this case, from the viewpoint of the receiver (i), only the signal from the transmitter (i) is considered to be a desired signal, and the remaining signals are considered to be interference signals.

Figure 16:
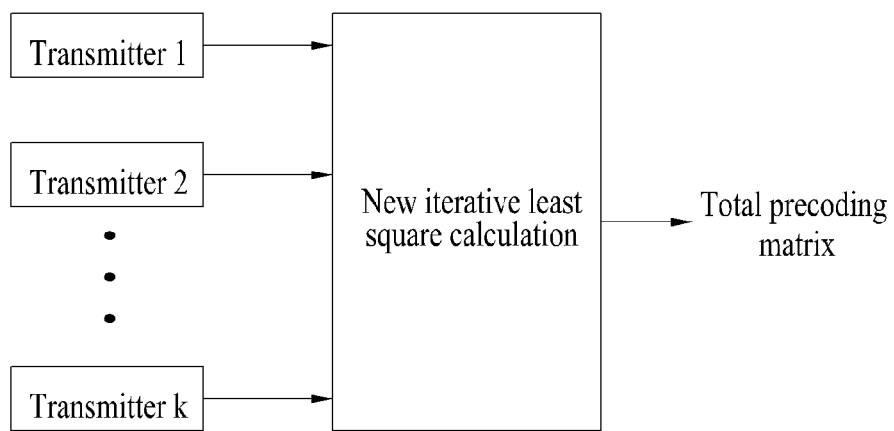
FIG. 16 is a block diagram illustrating a system for generating a precoding matrix according to a fifth embodiment of the present invention.

FIG. 16 is a block diagram illustrating a system for generating a precoding matrix according to a fifth embodiment of the present invention.

FIG. 16 shows the process for calculating the precoding matrix of the transmitter using the new iterative least square method according to the embodiments. The new iterative least square method is configured to update the precoding matrix based on the iterative method not only using the precoding matrix of the initialized transmitter but also using channel information of users.

The following equation 23 shows a specific condition in which the interference alignment is achieved under the condition that K users exist and each user has an M-dimensional signal space. In this case, transmission resources may be occupied using a plurality of antennas, or may also be occupied using frequency binning or symbol extension. $H_{ji}$ is a (M×M) MIMO channel ranging from the transmitter (i) to the receiver (j). Pi is a precoding matrix for use in the transmitter (i). Pi is a (M×M) matrix, and L is the number of input signals applied to the transmitter (i). In addition, span(A) is a vector space obtained when columns of a certain matrix (A) are composed of arbitrary combinations.

$$\text{span}(H_{12}P_2)=\text{span}(H_{13}P_3)=\ldots=\text{span}(H_{1K}P_K)$$

$$\text{span}(H_{21}P_1)=\text{span}(H_{23}P_3)=\ldots=\text{span}(H_{2K}P_K)$$

$$\ldots$$

$$\text{span}(H_{K1}P_1)=\text{span}(H_{K2}P_2)=\ldots=\text{span}(H_{K(K-1)}P_{K-1}) \quad \text{[Equation 23]}$$

Equation 23 denotes a sufficient condition for interference alignment such that interference received from other users is arranged in the same space. For example, according to a condition of a first row, signals sequentially applied in the order of Transmitter 2-→Transmitter 3-→ . . . →Transmitter K→Receiver 1 are received in the same space. That is, the above condition indicates that interferences received from Receiver 1 to other users are arranged in the same space.

According to the interference alignment (IA) method using the conventional least square method, a precoding matrix of the user is generated by calculating Equation 24 using the least square method.

$$H_{12}P_2=H_{13}P_3=\ldots=H_{1K}P_K$$

$$H_{21}P_1=H_{23}P_3=\ldots=H_{2K}P_K$$

$$\ldots$$

$$H_{K1}P_1=H_{K2}P_2=\ldots=H_{K(K-1)}P_{K-1} \quad \text{[Equation 24]}$$

However, Equation 24 excessively restricts the condition of Equation 23. therefore, the precoding matrix is designed using Equation 25 so as to achieve the condition having a smaller number of restrictions than Equation 24.

$$R_1H_{12}P_2=R_1H_{13}P_3=\ldots=R_1H_{1K}P_K=0$$

$$R_2H_{21}P_1=R_2H_{23}P_3=\ldots=R_2H_{2K}P_K=0$$

$$\ldots$$

$$R_KH_{K1}P_1=R_KH_{K2}P_2=\ldots=R_KH_{K(K-1)}P_{K-1}=0 \quad \text{[Equation 25]}$$

In Equation 25, $R_k$ is a (L×M) matrix serving as an assistant matrix for the transmitter (k). The condition of Equation 25 shows that signals received from other users are arranged in a null space of the assistant matrix. The condition of the k-th row shown in Equation 25 denotes a condition in which interferences of other users will be aligned by the receiver (k).

Equation 25 has a smaller number of restrictions than Equation 24, and an assistant matrix should be calculated only in association with the precoding matrix $P_k$ under an arbitrary given state, such that Equation 25 has a lower calculation complexity than Equation 23.

The least square calculation method of Equation 25 is simpler than the least square method of Equation 24, and may have a value even if many more users exist.

First, in association with k=1, . . . , K, the precoding matrix $P_k$ is generated as an arbitrary (L×M) matrix. Thereafter, the assistant matrix is calculated as shown in the following equation 26.

$$R_k=(H_{kk}P_k)^H \quad \text{[Equation 26]}$$

Equation 26 is a specific equation for matching the assistant matrix for use in the transmitter (k) to a desired signal space of the receiver (k).

The following description relates to a method for calculating the precoding matrices. The following Equation 27 and the Equation 28 are conditions for calculating the precoding matrix $P_k$ at the condition of Equation 25.

$$H'_kP_k=0 \quad \text{[Equation 27]}$$

$$H'_k = \begin{bmatrix} R_1H_{1k} \\ R_2H_{2k} \\ \ldots \\ R_{k-1}H_{(k-1)k} \\ R_{k+1}H_{(k+1)k} \\ \ldots \\ R_kH_{Kk} \end{bmatrix} \quad \text{[Equation 28]}$$

However, in case of K≥(M/L)+1, $P_k$ at serving as a value for satisfying the Equations 27 and 28 may not exist, such that the Equation 29 for searching for $P_k$ achieving least square is calculated to search for a specific $P_k$ value capable of maximally satisfying the condition of Equation 25.

$$P'_k=\text{argmin}_{P_k}\|H'_kP_k\|^2 \text{ s.t. } \|P_k\|=1 \quad \text{[Equation 29]}$$

Equation 29 selects the smallest eigen value (L) of the matrix $H'_k{}^HH'_k$, and makes a specific matrix in which an eigen vector (L) corresponding to the smallest eigen value (L) is used as a column, such that it is possible to search for the $P_k$ value. That is, each column of the $P_k$ value is an eigen vector corresponding to the smallest eigen value (L). In this case, $(\bullet)^H$ is a Hermitian transpose matrix of a certain matrix.

After all the precoding matrices for k=1, . . . K are calculated, the assistant matrices are re-calculated using Equation 26.

Equation 26 and Equation 29 are repeatedly calculated using the above-mentioned scheme such that the assistant matrix and the precoding matrix can be re-calculated. Thereafter, if sufficient convergence has been achieved, the above-mentioned repetition process is ended.

Although the above-mentioned description shows that the assistant matrix is first calculated using Equation 26 and the precoding matrix is then calculated using Equation 29, it should be noted that Equation 29 may be calculated earlier than Equation 26 as necessary.

Figure 17:
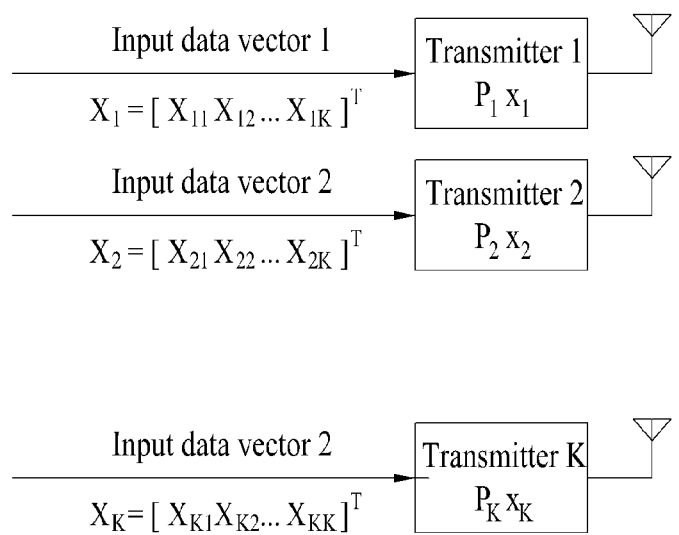
FIG. 17 is a conceptual diagram illustrating a method for generating a transmission signal by a transmitter according to a fifth embodiment of the present invention.

FIG. 17 is a conceptual diagram illustrating a method for generating a transmission signal by a transmitter according to a fifth embodiment of the present invention.

The transmitters of FIG. 17 make transmission signals using the precoding matrix generated as shown in FIG. 16 and then transmits the resultant transmission signals. In this case, each transmitter multiplies L transmission data vectors by the precoding matrices, makes a transmission signal vector, and transmits the transmission signal vector.

The receivers having received the transmission signals from the transmitter are operated as follows.

When the transmitter transmits signals using the precoding matrix generated by the method of FIG. 16, the interference signal spatial matrix received by the receiver (k) may be denoted by the following equation 30.

$$H''_k = [H_{k1}P'_1, \ldots, H_{k(k-1)}P'_{k-1}, H_{k(k+1)}P'_{k+1}, \ldots, H_{kK}P'_K] \quad \text{[Equation 30]}$$

Equation 30 is a matrix obtained when each direction vector of signals from the remaining transmitters other than signals ranging from the receiver (k) to the transmitter (k) is used as each column. That is, $H''_k$ of Equation 30 is used as space of interferences received by the receiver (k). Therefore, signals received by the receiver (k) may be projected on space having minimum interference, or the signals pass through the MMSE filter such that transmission data can be estimated.

$$z_k^{ZF} = S_s^H y_k \quad \text{[Equation 31]}$$

$$Z_k^{MMSE} = (H_{kk}P'_k)^H (H''_k * H''_k{}^T + \sigma^2 I_M)^{-1} y_k \quad \text{[Equation 32]}$$

In Equation 31, $y_k$ is a (M×1) vector received by the receiver (k).

$z_k^{ZF}$ denotes an (L×1) vector obtained after the reception signal is projected on space having minimum interference, and is used as an estimation value of data transmitted from the transmitter (k). $S_s$ is a (M×L) matrix in which an eigen vector corresponding to the smallest L eigen values of $H''_k H''_k{}^H$ is used as a column.

In Equation 32, $y_k$ is an (M×1) vector received by the receiver (k). $z_k^{MMSE}$ is a vector obtained after the reception vector $y_k$ has passed through the MMSE. $H''_k * H''_k{}^T$ is a (M×M) matrix corresponding to a total sum of an interference direction. $\sigma^2$ is an intensity of a noise component, and $I_M$ is an (M×M)-sized unitary matrix. $(\bullet)^*$ is a Hermitian transpose matrix of a certain matrix, and $(\bullet)^T$ is a transpose matrix of a certain matrix.

Figure 18A:
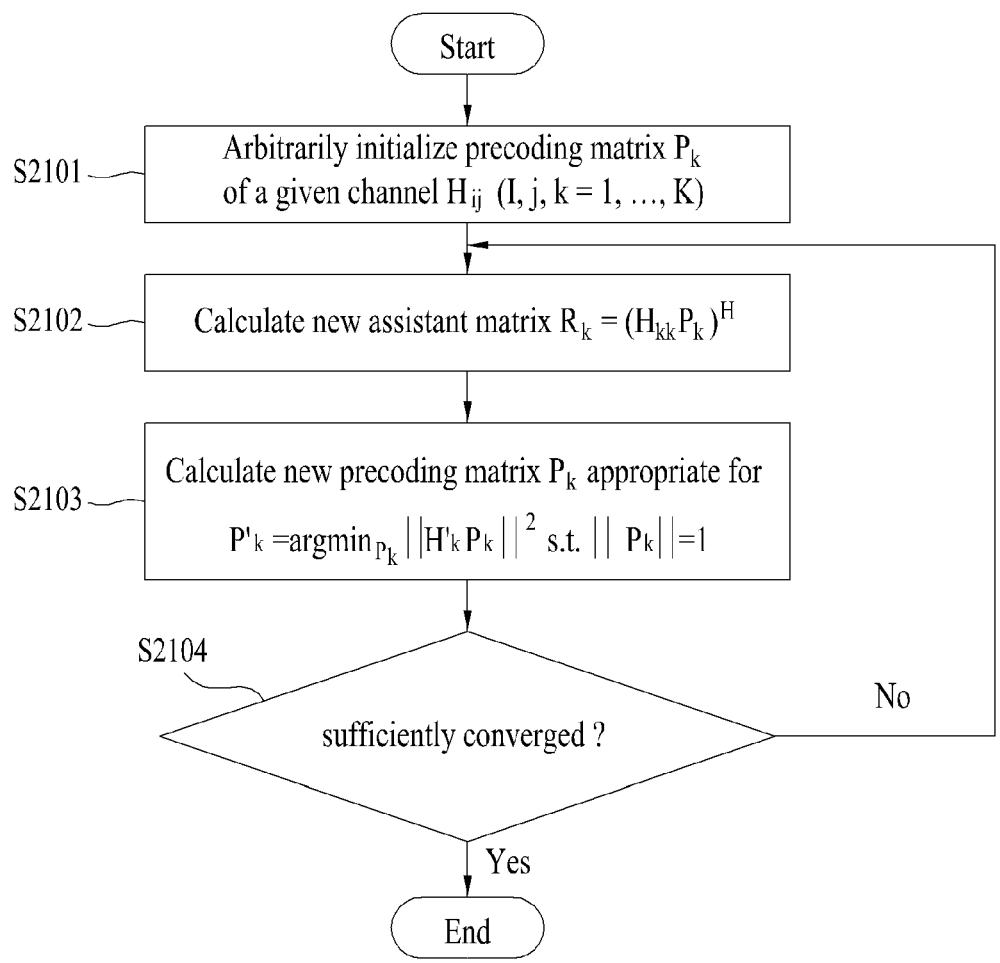
FIGS. 18A and 18B are flowcharts illustrating a method for generating a precoding matrix according to a fifth embodiment of the present invention.
Figure 18B:
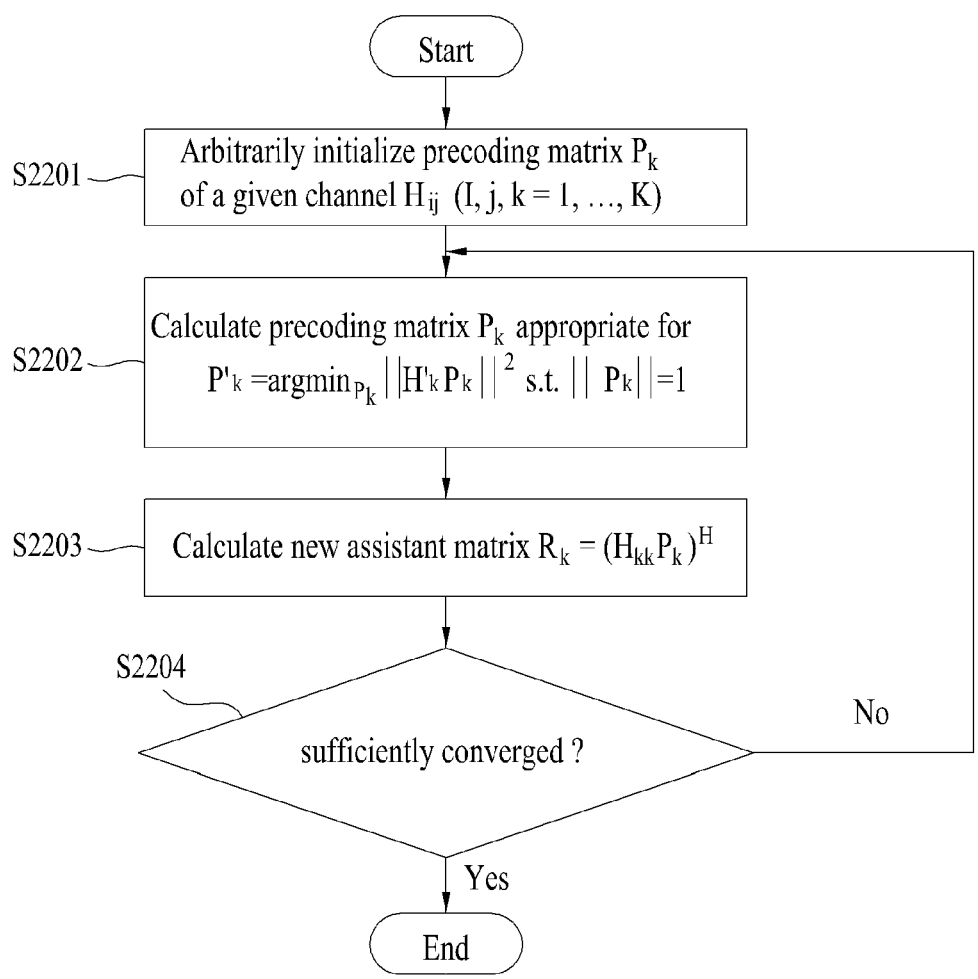

FIGS. 18A and 18B are flowcharts illustrating a method for generating a precoding matrix according to a fifth embodiment of the present invention.

Figure 19A:
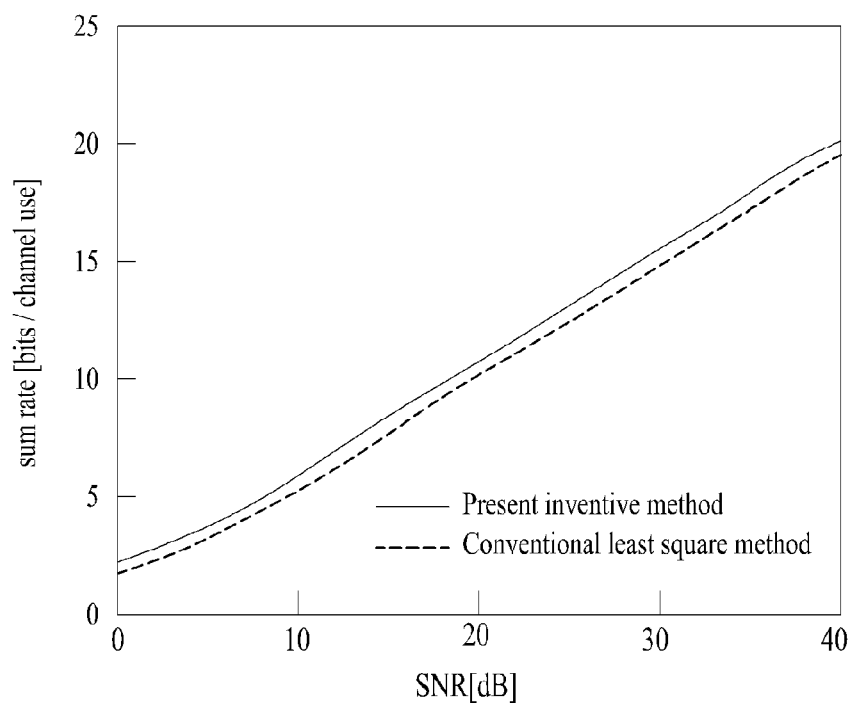
FIGS. 19A and 19B are graphs illustrating a total transfer rate according to a fifth embodiment of the present invention.
Figure 19B:
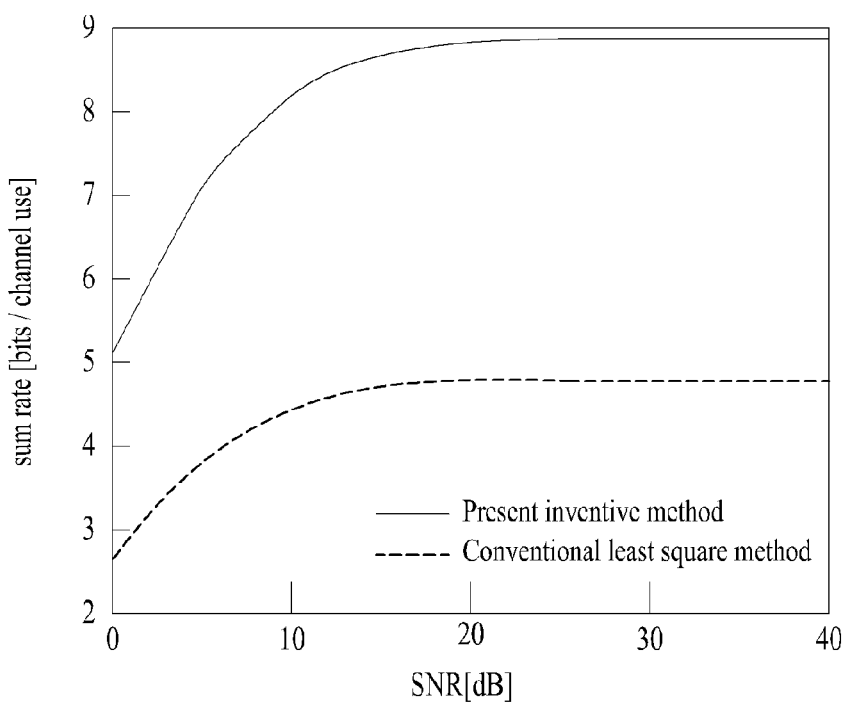

The iterative process of FIG. 17 is shown in FIGS. 18A and 19B. FIG. 18B shows a method for first calculating the assistant matrix of all transmitters, calculating the precoding matrix of all transmitters, and then performing iteration. Steps S2101 and S2202 are used to initialize the precoding matrix. In steps S2101 and S2202, the assistant matrix and the precoding matrix of all the transmitters are allocated to arbitrary matrices. Steps S2102 and S2203 are used to calculate the assistant matrix of all transmitters using Equation 26. Steps S2103 and S2202 are used to calculate the precoding matrix of all transmitters using Equation 29. Steps S2104 and S2204 are used to determine whether the iteration process will be ended after the degree of convergence is determined through the above iteration process.

FIGS. 19A and 19B are graphs illustrating a total transfer rate according to a fifth embodiment of the present invention.

FIG. 19A is a graph illustrating a sum rate for each user obtained when the conventional least square method and the inventive method are used under the condition that the number of users is set to 3 and the number of dimensions of a transmittable signal is set to 4.

FIG. 19B is a graph illustrating a sum rate for each user obtained when the conventional least square method and the inventive method are used under the condition that the number of users is set to 8 and the number of dimensions of a transmittable signal is set to 4.

Referring to FIGS. 19A and 19B, it can be recognized that the inventive method of the present invention has a higher per-user sum rate.

Figure 20:
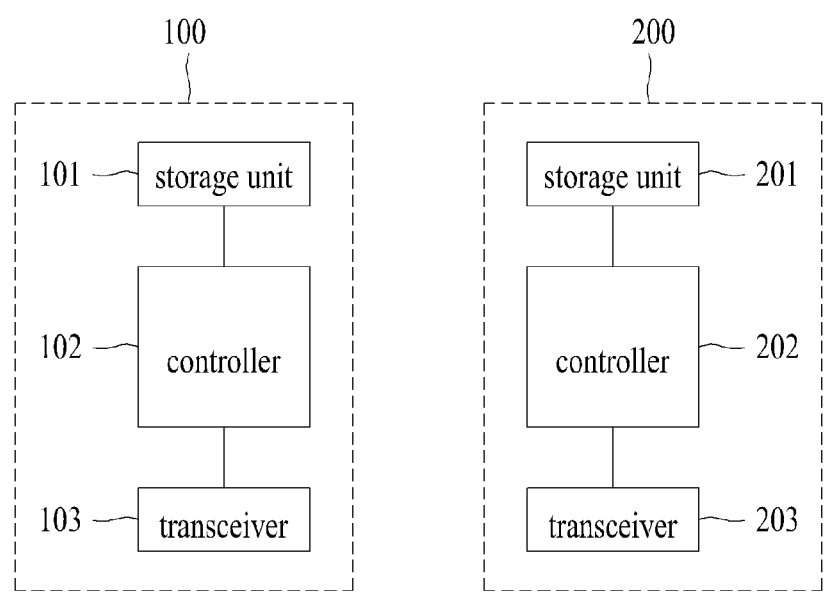
FIG. 20 is a block diagram illustrating a user equipment (UE) and a base station (BS) according to embodiments of the present invention.

FIG. 20 is a block diagram illustrating a user equipment (UE) and a base station (BS) according to embodiments of the present invention.

Referring to FIG. 20, the UE 100 includes a storage unit 101, a controller 102, and a transceiver 103. The BS 200 includes a storage unit 201, a controller 202, and a transceiver 203.

The storage units (101, 201) are configured to store the methods of FIGS. 1 to 19.

The controllers (102, 202) are configured to control the storage units (101, 201) and the transceivers (103, 203). In more detail, the controllers (102, 202) are configured to carry out the methods stored in the storage units (101, 201). The controllers (102, 202) are configured to transmit/receive the above-mentioned signals through the transceivers (103, 203).

The controllers (102, 202) may include an Application Specific Integrated Circuit (ASIC), other chip sets, logic circuits and/or a data processing device. The storage units (101, 202) may include a Read Only Memory (ROM), a Random Access Memory (RAM), a flash memory, a memory card, a storage medium, and/or other storage devices. The transceivers (103, 203) may include a baseband circuit for processing RF signals. When the embodiment is implemented by software, the above-mentioned method may be implemented as modules (step, function, etc.) configured to perform the above-mentioned function. The modules may be stored in the storage units (101, 201), and may be carried out by the controllers (102, 202).

The storage units (101, 201) may be located inside or outside the controllers (102, 202), and may be connected to the controllers (102, 202) after being implemented as a variety of well known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for aligning reception signals and interference signals by a base station (BS) configured to receive a signal from at least one user equipment (UE) in a cellular network, the method comprising:

receiving, by a transceiver of the BS, the reception signals and the interference signals, wherein the reception signals are received from UEs belonging to a serving cell of the BS, and the interference signals are received from UEs belonging to a neighbor cell of the BS; and aligning, by a controller of the BS, the reception signals and the interference signals, wherein the controller divides a signal space receiving the reception signals and the interference signals into a plurality of divided signal spaces, each having a size of N, wherein the controller arranges K reception signals from among the reception signals in each divided signal space, wherein the K reception signals arranged in each divided signal space are orthogonal to each other, wherein the interference signals are configured to satisfy an equation $H_{bi}{}^a v_{bi} = r^a$, wherein 'a' is a serving cell of the BS, 'b' is a neighbor cell of the BS, $H_{bi}{}^a$ is a channel matrix of a channel ranging from an i-th UE belonging to the neighbor cell 'b' to the serving cell 'a', $v_{bi}$ is a beamforming vector of the i-th UE belonging to the neighbor cell 'b', $r^a$ is a signal space in which the interference signals of the cell 'a' are arranged, and the K reception signals aligned in each divided signal space are configured to satisfy an equation $(H_{ai}{}^a v_{ai})^H (H_{aj}{}^a v_{aj}) = 0$, and wherein $H_{ai}{}^a$ is a channel matrix of a channel ranging from an i-th UE belonging to the cell 'a' to the BS, $v_{ai}$ is a beamforming vector of the i-th UE belonging to the cell 'a', $H_{aj}{}^a$ is a channel matrix of a channel ranging from a j-th UE belonging to the cell 'a' to the BS, $v_{aj}$ is a beamforming vector of the j-th UE belonging to the cell 'a', and $(\bullet)^H$ is a Hermitian transpose matrix of one matrix.

2. The method according to claim 1, wherein N and K are configured to satisfy a condition of N≥(3K/2).

3. The method according to claim 1, wherein N is set to 3 and K is set to 2.

4. A method for aligning reception signals and interference signals by a base station (BS) configured to receive a signal from at least one user equipment (UE) in a cellular network, the method comprising:

receiving, by a transceiver of the BS, the reception signals and the interference signals, wherein the reception signals are received from UEs belonging to a serving cell of the BS, and the interference signals are received from UEs belonging to a neighbor cell of the BS; and aligning, by a controller of the BS, the reception signals and the interference signals, wherein the controller determines a signal space of the interference signals, wherein the controller initializes a transmission vector of the reception signals, wherein the controller generates a reception signal spatial matrix on the basis of the initialized transmission vector and a channel matrix of a channel ranging from a UE belonging to a serving cell of the BS to the BS, wherein the controller performs QR decomposition of the reception signal spatial matrix into an orthogonal matrix and an upper triangular matrix, wherein the controller generates a user vector for a UE belonging to the serving cell of the BS on the basis of the decomposed orthogonal matrix and the channel matrix, wherein the controller updates the transmission vector of the aligned reception signals on the basis of the user vector and the signal space, wherein the updating of the transmission vector of the reception signals includes performing an update using an equation $$v_{ak} = (H_{ak}^b)^{-1} \frac{(r^b)^H (H_{ak}^b z_{ak})}{(r^b)^H r^b} r^b,$$

and wherein 'a' is a serving cell of the BS, 'b' is a neighbor cell of the BS, $v_{ak}$ is a beamforming vector of a k-th UE belonging to the cell 'a', $H_{ak}^b$ is a channel matrix of a channel ranging from a k-th UE belonging to the cell 'a' to the cell 'b', $r^b$ is a signal space in which interference signals of the cell 'b' are to be arranged, $z_{ak}$ is a user vector of a K-th UE belonging to the cell 'a', and $(\bullet)^H$ is a Hermitian transpose matrix of one matrix.

5. The method according to claim 4, further comprising:

after updating the transmission vector of the reception signals, determining whether the updated transmission vector converges on a predetermined range.

6. The method according to claim 4, wherein the generating of the reception signal spatial matrix includes generating the reception signal spatial matrix through an equation $[H_{a1}{}^a v_{a1}, H_{a2}{}^a v_{a2}, \ldots, H_{ak}{}^a v_{ak}]$, where 'a' is a serving cell of the BS, $H_{ak}{}^a$ is a channel matrix of a channel ranging from a k-th UE belonging to the cell 'a' to the cell 'a', and $v_{ak}$ is a beamforming vector of the k-th UE belonging to the cell 'a'.

7. The method according to claim 4, wherein the generating of the user vector of the UE belonging to the serving cell of the BS includes generating the user vector through an equation $z_{ak} = (H_{ak}{}^a)^{-1} Q_a(:,k)$, where 'a' is a serving cell of the BS, $z_{ak}$ is a user vector of a K-th UE belonging to the cell 'a', $H_{ak}{}^a$ is a channel matrix of a channel ranging from a k-th UE belonging to the cell 'a' to the cell 'a', and $Q_a(:,k)$ is a matrix composed of a K-th column of the orthogonal matrix.

8. A base station (BS) for aligning reception signals and interference signals in a cellular network, the BS comprising:

a transceiver configured to transmit/receive signals to/from an external port; and a controller configured to be connected to the transceiver, wherein the controller is further configured to:

control the transceiver to receive the reception signals from UEs belonging to a serving cell of the BS and the interference signals from UEs belonging to a neighbor cell of the BS, and align the reception signals and the interference signals, wherein the controller divides a signal space receiving the reception signals and the interference signals into a plurality of divided signal spaces, each having a size of N, wherein the controller arranges K reception signals from among the reception signals in each divided signal space, wherein the K reception signals arranged in each divided signal space are orthogonal to each other, wherein the interference signals are configured to satisfy an equation $H_{bi}{}^a v_{bi} = r^a$, wherein 'a' is a serving cell of the BS, 'b' is a neighbor cell of the BS, $H_{bi}{}^a$ is a channel matrix of a channel ranging from an i-th UE belonging to the neighbor cell 'b' to the serving cell 'a', $v_{bi}$ is a beamforming vector of the i-th UE belonging to the neighbor cell 'b', $r^a$ is a signal space in which the interference signals of the cell 'a' are arranged, and the K reception signals aligned in each divided signal space are configured to satisfy an equation $(H_{ai}{}^a v_{ai})^H (H_{aj}{}^a v_{aj}) = 0$, and wherein $H_{ai}{}^a$ is a channel matrix of a channel ranging from an i-th UE belonging to the cell 'a' to the BS, $v_{ai}$ is a beamforming vector of the i-th UE belonging to the cell 'a', $H_{aj}{}^a$ is a channel matrix of a channel ranging from a j-th UE belonging to the cell 'a' to the BS, $v_{aj}$ is a beamforming vector of the j-th UE belonging to the cell 'a', and $(\bullet)^H$ is a Hermitian transpose matrix of one matrix.

9. The base station (BS) according to claim 8, wherein N is set to 3 and K is set to 2.

10. A base station (BS) for aligning reception signals and interference signals in a cellular network, the BS comprising:

a transceiver configured to transmit/receive signals to/from an external port; and
a controller configured to be connected to the transceiver,
wherein the controller is further configured to:
control the transceiver to receive the reception signals from UEs belonging to a serving cell of the BS, and the interference signals from UEs belonging to a neighbor cell of the BS, and
align the reception signals and interference signals,
wherein the controller determines a signal space of the interference signals,
wherein the controller initializes a transmission vector of the reception signals,
wherein the controller generates a first matrix on the basis of the initialized transmission vector and a channel matrix of a channel ranging from a UE belonging to a serving cell of the BS to the BS,
wherein the controller performs QR decomposition of the first matrix,
wherein the controller generates a user vector for a UE belonging to the serving cell of the BS on the basis of the decomposed Q matrix and the channel matrix,
wherein the controller updates the transmission vector of the reception signals on the basis of the user vector and the signal space,
wherein the updating of the transmission vector of the reception signals includes performing an update using an equation $$v_{ak} = (H_{ak}^{b})^{-1} \frac{(r^{b})^{H}(H_{ak}^{b} z_{ak})}{(r^{b})^{H} r^{b}} r^{b},$$

and wherein 'a' is a serving cell of the BS, 'b' is a neighbor cell of the BS, $v_{ak}$ is a beamforming vector of a k-th UE belonging to the cell 'a', $H_{ak}^{b}$ is a channel matrix of a channel ranging from a k-th UE belonging to the cell 'a' to the cell 'b', $r^{b}$ is a signal space in which interference signals of the cell 'b' are to be arranged, $z_{ak}$ is a user vector of a K-th UE belonging to the cell 'a', and $(\bullet)^{H}$ is a Hermitian transpose matrix of one matrix.

11. The BS according to claim 10, wherein the controller is further configured to determine whether the updated transmission vectors converge on a predetermined range after updating the transmission vector of the reception signals.

* * * * *